(12) United States Patent
Lee et al.

(10) Patent No.: US 12,732,807 B2
(45) Date of Patent: Sep. 8, 2026

(54) LOCATION TRACKING FOR A TAG DEVICE

(71) Applicant: QUALCOMM Incorporated, San Diego, CA (US)

(72) Inventors: Soo Bum Lee, San Diego, CA (US); Gavin Bernard Horn, La Jolla, CA (US)

(73) Assignee: QUALCOMM Incorporated, San Diego, CA (US)

(*) Notice: Subject to any disclaimer, the term of this patent is extended or adjusted under 35 U.S.C. 154(b) by 452 days.

(21) Appl. No.: 18/309,581

(22) Filed: Apr. 28, 2023

(65) Prior Publication Data

US 2024/0365115 A1 Oct. 31, 2024

(51) Int. Cl.

| | |
|---|---|
| ***H04W 12/0431*** | (2021.01) |
| ***H04W 4/029*** | (2018.01) |
| ***H04W 12/71*** | (2021.01) |

(52) U.S. Cl.

CPC ....... *H04W 12/0431* (2021.01); *H04W 4/029* (2018.02); *H04W 12/71* (2021.01)

(58) Field of Classification Search

None

See application file for complete search history.

(56) References Cited

U.S. PATENT DOCUMENTS

| | | | | |
|---|---|---|---|---|
| 10,694,053 | B1 * | 6/2020 | Ebner | H04N 1/00315 |
| 2017/0068930 | A1 * | 3/2017 | Attar | G06K 19/07758 |
| 2020/0037109 | A1 * | 1/2020 | Zhang | G01S 5/0218 |
| 2020/0107164 | A1 * | 4/2020 | Lopatin | G01S 5/0284 |
| 2021/0119775 | A1 * | 4/2021 | Klinkner | H04L 9/0844 |
| 2021/0185978 | A1 * | 6/2021 | Jones | H04W 4/029 |
| 2022/0264247 | A1 | 8/2022 | Vega et al. | |
| 2023/0043248 | A1 * | 2/2023 | Huang | H04W 56/002 |

OTHER PUBLICATIONS

International Search Report and Written Opinion—PCT/US2024/025055—ISA/EPO—Jul. 5, 2024.

* cited by examiner

*Primary Examiner* — Adolf Dsouza
(74) *Attorney, Agent, or Firm* — Polsinelli LLP

(57) ABSTRACT

In a wireless communication system, a process may include determining if a first device is separated with respect to a second device associated with the first device; generating tag information associated with a public key; and based on the determination that the first device is separated, broadcasting the tag information.

28 Claims, 10 Drawing Sheets

LOCATION TRACKING FOR A TAG DEVICE

FIELD

Aspects of the present disclosure generally relate to wireless communications. For example, aspects of the present disclosure relate to finding net zero power Internet of Things (IoT) remote tags.

INTRODUCTION

Wireless communications systems are deployed to provide various telecommunication services, including telephony, video, data, messaging, broadcasts, among others. Wireless communications systems have developed through various generations, including a first-generation analog wireless phone service (1G), a second-generation (2G) digital wireless phone service (including interim 2.5G networks), a third-generation (3G) high speed data, Internet-capable wireless service, a fourth-generation (4G) service (e.g., Long-Term Evolution (LTE), WiMax), and a fifth-generation (5G) service (e.g., New Radio (NR)). There are presently many different types of wireless communications systems in use, including cellular and personal communications service (PCS) systems. Examples of known cellular systems include the cellular Analog Advanced Mobile Phone System (AMPS), and digital cellular systems based on code division multiple access (CDMA), frequency division multiple access (FDMA), time division multiple access (TDMA), the Global System for Mobile communication (GSM), etc.

SUMMARY

The following presents a simplified summary relating to one or more aspects disclosed herein. Thus, the following summary should not be considered an extensive overview relating to all contemplated aspects, nor should the following summary be considered to identify key or critical elements relating to all contemplated aspects or to delineate the scope associated with any particular aspect. Accordingly, the following summary has the sole purpose to present certain concepts relating to one or more aspects relating to the mechanisms disclosed herein in a simplified form to precede the detailed description presented below.

Disclosed are systems, methods, apparatuses, and computer-readable media for performing wireless communication. According to at least one illustrative example, a first device for wireless communication is provided. The first device includes a memory and a processor coupled to the memory. The processor is configured to: determine the first device is separated with respect to a second device associated with the first device; generate tag information associated with a public key; and based on the determination that the first device is separated, broadcast the tag information.

As another example, a device for wireless communications is provided. The apparatus includes: at least one memory comprising instructions; and at least one processor coupled to the at least one memory and configured to: receive a broadcast from a tag device, wherein the broadcast comprises a tag identifier; transmit the tag identifier to a first location tracking service; receive, from the first location tracking service, a public key associated with the tag device; obtain location information for the device; encrypt the location information based on the public key; and transmit the encrypted location information to the first location tracking service.

In another example, a method for wireless communications is provided. The method includes: determining a first device is separated with respect to a second device associated with the first device; generate tag information associated with a public key; and based on the determination that the first device is separated, broadcast the tag information.

As another example, a method for wireless communications is provided. The method includes: receiving a broadcast from a tag device, wherein the broadcast comprises a tag identifier; transmitting the tag identifier to a first location tracking service; receiving, from the first location tracking service, a public key associated with the tag device; obtaining location information; encrypting the location information based on the public key; and transmitting the encrypted location information to the first location tracking service.

In another example, a non-transitory computer-readable medium having stored thereon instructions is provided. The instructions, when executed by one or more processors, cause the at one or more processors to determine the first device is separated with respect to a second device associated with the first device; generate tag information associated with a public key; and based on the determination that the first device is separated, broadcast the tag information.

As another example, a non-transitory computer-readable medium having stored thereon instructions is provided. The instructions, when executed by one or more processors, cause the at one or more processors to receive a broadcast from a tag device, wherein the broadcast comprises a tag identifier; transmit the tag identifier to a first location tracking service; receive, from the first location tracking service, a public key associated with the tag device; obtain location information for the device; encrypt the location information based on the public key; and transmit the encrypted location information to the first location tracking service.

In another example, an apparatus for wireless communications is provided. The apparatus includes means for determining a first device is separated with respect to a second device associated with the first device; means for generating tag information associated with a public key; and means for, based on the determination that the first device is separated, broadcasting the tag information.

As another example, an apparatus for wireless communications is provided. The apparatus includes means for receiving a broadcast from a tag device, wherein the broadcast comprises a tag identifier; means for transmitting the tag identifier to a first location tracking service; means for receiving, from the first location tracking service, a public key associated with the tag device; obtaining location information; means for encrypting the location information based on the public key; and means for transmitting the encrypted location information to the first location tracking service.

Aspects generally include a method, apparatus, system, computer program product, non-transitory computer-readable medium, user equipment, base station, wireless communication device, and/or processing system as substantially described herein with reference to and as illustrated by the drawings and specification.

Aspects generally include a method, apparatus, system, computer program product, non-transitory computer-readable medium, user equipment, base station, wireless communication device, and/or processing system as substantially described herein with reference to and as illustrated by the drawings and specification.

The foregoing has outlined rather broadly the features and technical advantages of examples according to the disclosure in order that the detailed description that follows may be better understood. Additional features and advantages will be described hereinafter. The conception and specific examples disclosed may be readily utilized as a basis for modifying or designing other structures for carrying out the same purposes of the present disclosure. Such equivalent constructions do not depart from the scope of the appended claims. Characteristics of the concepts disclosed herein, both their organization and method of operation, together with associated advantages, will be better understood from the following description when considered in connection with the accompanying figures. Each of the figures is provided for the purposes of illustration and description, and not as a definition of the limits of the claims.

While aspects are described in the present disclosure by illustration to some examples, those skilled in the art will understand that such aspects may be implemented in many different arrangements and scenarios. Techniques described herein may be implemented using different platform types, devices, systems, shapes, sizes, and/or packaging arrangements. For example, some aspects may be implemented via integrated chip implementations or other non-module-component based devices (e.g., end-user devices, vehicles, communication devices, computing devices, industrial equipment, retail/purchasing devices, medical devices, and/or artificial intelligence devices). Aspects may be implemented in chip-level components, modular components, non-modular components, non-chip-level components, device-level components, and/or system-level components. Devices incorporating described aspects and features may include additional components and features for implementation and practice of claimed and described aspects. For example, transmission and reception of wireless signals may include one or more components for analog and digital purposes (e.g., hardware components including antennas, radio frequency (RF) chains, power amplifiers, modulators, buffers, processors, interleavers, adders, and/or summers). It is intended that aspects described herein may be practiced in a wide variety of devices, components, systems, distributed arrangements, and/or end-user devices of varying size, shape, and constitution.

Other objects and advantages associated with the aspects disclosed herein will be apparent to those skilled in the art based on the accompanying drawings and detailed description. This summary is not intended to identify key or essential features of the claimed subject matter, nor is it intended to be used in isolation to determine the scope of the claimed subject matter. The subject matter should be understood by reference to appropriate portions of the entire specification of this patent, any or all drawings, and each claim.

The foregoing, together with other features and aspects, will become more apparent upon referring to the following specification, claims, and accompanying drawings.

BRIEF DESCRIPTION OF THE DRAWINGS

The accompanying drawings are presented to aid in the description of various aspects of the disclosure and are provided solely for illustration of the aspects and not limitation thereof.

DETAILED DESCRIPTION

Figure 1:
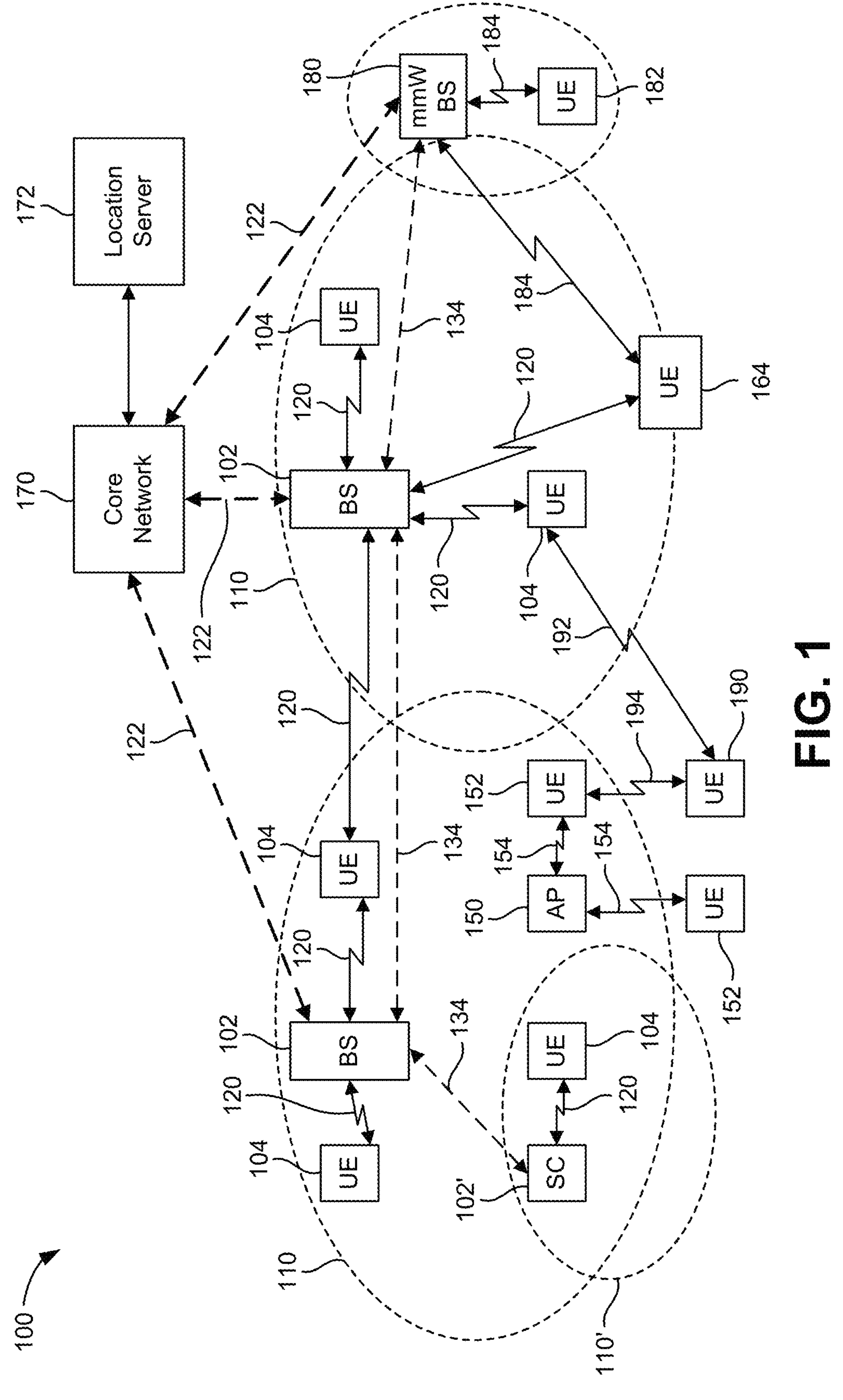
FIG. 1 is a block diagram illustrating an example of a wireless communication network, in accordance with some examples.

Certain aspects of this disclosure are provided below for illustration purposes. Alternate aspects may be devised without departing from the scope of the disclosure. Additionally, well-known elements of the disclosure will not be described in detail or will be omitted so as not to obscure the relevant details of the disclosure. Some of the aspects described herein may be applied independently and some of them may be applied in combination as would be apparent to those of skill in the art. In the following description, for the purposes of explanation, specific details are set forth in order to provide a thorough understanding of aspects of the application. However, it will be apparent that various aspects may be practiced without these specific details. The figures and description are not intended to be restrictive.

The ensuing description provides example aspects only, and is not intended to limit the scope, applicability, or configuration of the disclosure. Rather, the ensuing description of the example aspects will provide those skilled in the art with an enabling description for implementing an example aspect. It should be understood that various changes may be made in the function and arrangement of elements without departing from the scope of the application as set forth in the appended claims.

Wireless communication networks can be deployed to provide various communication services, such as voice, video, packet data, messaging, broadcast, any combination thereof, or other communication services. A wireless communication network may support both access links and sidelinks for communication between wireless devices. An access link may refer to any communication link between a client device (e.g., a user equipment (UE), a station (STA), or other client device) and a base station (e.g., a 3GPP gNB for 5G/NR, a 3GPP eNB for 4G/LTE, a Wi-Fi access point (AP), or other base station). For example, an access link may support uplink signaling, downlink signaling, connection procedures, etc. An example of an access link is a Uu link or interface (also referred to as an NR-Uu) between a 3GPP gNB and a UE.

In various wireless communication networks, client devices can be utilized that may be associated with different signaling and communication needs. For example, as 5G networks expand into industrial verticals and the quantity of deployed Internet-of-Things (IoT) devices grows, network service categories such as enhanced Mobile Broadband (cMBB), Ultra Reliable Low Latency Communications (URLLC), and massive Machine Type Communications (mMTC), etc., may be expanded to better support various IoT devices, which can include passive IoT devices, semi-passive IoT devices, etc.

For example, passive IoT devices and semi-passive IoT devices are relatively low-cost UEs that may be used to implement one or more sensing and communication capabilities in an IoT network or deployment. In some examples, passive and/or semi-passive IoT sensors (e.g., devices) can be used to provide sensing capabilities for various processes and use cases, such as asset management, logistics, warehousing, manufacturing, etc. Passive and semi-passive IoT devices can include one or more sensors, a processor or micro-controller, and an energy harvester for generating electrical power from incident downlink radio frequency (RF) signals received at the passive or semi-passive IoT device.

One application of IoT devices includes tag devices, which are often attached to items to be tracked. These tag devices are generally low-cost devices which may, upon detecting that the tag device is lost/misplaced, broadcast a Bluetooth low energy (BLE) signal including a public key associated with the tag device that may be detected by nearby devices. The nearby devices may then relay the information from the BLE signal to a location tracking services to allow the tag device, and attached item, to be located. In some cases, the BLE protocol can limit a size of data packets within a single BLE transmission. Existing tag devices attempt to keep BLE broadcasts to a single transmission, which may limit a size of the public key of the tag device. Additionally, broadcasting the public key directly may allow for replay attacks, such as spamming or spoofing, to be performed with false location information. Thus, there is a desire for improved techniques for location tracking for a tag device.

Systems, apparatuses, processes (also referred to as methods), and computer-readable media (collectively referred to as "systems and techniques") are described herein for an improved technique for location tracking for a tag device. In some cases, when lost, tag information may be broadcast by a tag device. This tag information may be based on a public key, but may not be the unencoded public key. For example, the systems and techniques described herein can be used to encode a public key associated with the tag device as coded tag information for broadcast by the tag device. As an example, a public key may be hashed to a shorter (e.g., smaller) length for the coded tag information as a tag identifier. This shorter length tag identifier allows for a longer length public key to be used, as compared to BLE data packet sizes. In some cases, the tag identifier may be derived based on a hash of the public key of the tag device along with a parameter of a set of parameters. In some cases, an encrypted permanent identifier of the tag device may also be used for the coded tag information. The parameter used may be changed based on a current time and predefined time slots, which allow the tag identifier to be changed periodically. These time slots may be user configurable, which may allow a user to specify how often the tag identifier should be changed. In some cases, a routing identifier may be included in broadcasts from the tag device. Information received from the tag device broadcasts may then be routed to different location tracking services based on the routing identifier. In some cases, a routing service may be used to direct the information received from the tag device broadcasts, for example, using the routing identifier. This routing identifier helps allow for an ecosystem of location tracking services, rather than a single location tracking service.

Further aspects of the systems and techniques will be described with respect to the figures.

As used herein, the phrase "based on" shall not be construed as a reference to a closed set of information, one or more conditions, one or more factors, or the like. In other words, the phrase "based on A" (where "A" may be information, a condition, a factor, or the like) shall be construed as "based at least on A" unless specifically recited differently.

As used herein, the terms "user equipment" (UE) and "network entity" are not intended to be specific or otherwise limited to any particular radio access technology (RAT), unless otherwise noted. In general, a UE may be any wireless communication device (e.g., a mobile phone, router, tablet computer, laptop computer, and/or tracking device, etc.), wearable (e.g., smartwatch, smart-glasses, wearable ring, and/or an extended reality (XR) device such as a virtual reality (VR) headset, an augmented reality (AR) headset or glasses, or a mixed reality (MR) headset), vehicle (e.g., automobile, motorcycle, bicycle, etc.), aircraft (e.g., an airplane, jet, unmanned aerial vehicle (UAV) or drone, helicopter, airship, glider, etc.), and/or Internet of Things (IoT) device, etc., used by a user to communicate over a wireless communications network. A UE may be mobile or may (e.g., at certain times) be stationary, and may communicate with a radio access network (RAN). As used herein, the term "UE" may be referred to interchangeably as an "access terminal" or "AT," a "client device," a "wireless device," a "subscriber device," a "subscriber terminal," a "subscriber station," a "user terminal" or "UT," a "mobile device," a "mobile terminal," a "mobile station," or variations thereof. Generally, UEs can communicate with a core network via a RAN, and through the core network the UEs can be connected with external networks such as the Internet and with other UEs. Of course, other mechanisms of connecting to the core network and/or the Internet are also possible for the UEs, such as over wired access networks, wireless local area network (WLAN) networks (e.g., based on IEEE 802.11 communication standards, etc.), and so on.

A network entity can be implemented in an aggregated or monolithic base station architecture, or alternatively, in a disaggregated base station architecture, and may include one or more of a central unit (CU), a distributed unit (DU), a radio unit (RU), a Near-Real Time (Near-RT) RAN Intelligent Controller (RIC), or a Non-Real Time (Non-RT) RIC. A base station (e.g., with an aggregated/monolithic base station architecture or disaggregated base station architecture) may operate according to one of several RATs in communication with UEs depending on the network in which it is deployed, and may be alternatively referred to as an access point (AP), a network node, a NodeB (NB), an evolved NodeB (eNB), a next generation eNB (ng-eNB), a New Radio (NR) Node B (also referred to as a gNB or gNodeB), etc. A base station may be used primarily to support wireless access by UEs, including supporting data, voice, and/or signaling connections for the supported UEs. In some systems, a base station may provide edge node signaling functions while in other systems it may provide additional control and/or network management functions. A communication link through which UEs can send signals to a base station is called an uplink (UL) channel (e.g., a reverse traffic channel, a reverse control channel, an access channel, etc.). A communication link through which the base station can send signals to UEs is called a downlink (DL) or forward link channel (e.g., a paging channel, a control channel, a broadcast channel, or a forward traffic channel, etc.). The term traffic channel (TCH), as used herein, can refer to either an uplink, reverse or downlink, and/or a forward traffic channel.

The term "network entity" or "base station" (e.g., with an aggregated/monolithic base station architecture or disaggregated base station architecture) may refer to a single physical transmit receive point (TRP) or to multiple physical TRPs that may or may not be co-located. For example, where the term "network entity" or "base station" refers to a single physical TRP, the physical TRP may be an antenna of the base station corresponding to a cell (or several cell sectors) of the base station. Where the term "network entity" or "base station" refers to multiple co-located physical TRPs, the physical TRPs may be an array of antennas (e.g., as in a multiple-input multiple-output (MIMO) system or where the base station employs beamforming) of the base station. Where the term "base station" refers to multiple non-co-located physical TRPs, the physical TRPs may be a distributed antenna system (DAS) (e.g., a network of spatially separated antennas connected to a common source via a transport medium) or a remote radio head (RRH) (e.g., a remote base station connected to a serving base station). Alternatively, the non-co-located physical TRPs may be the serving base station receiving the measurement report from the UE and a neighbor base station whose reference radio frequency (RF) signals (e.g., or simply "reference signals") the UE is measuring. Because a TRP is the point from which a base station transmits and receives wireless signals, as used herein, references to transmission from or reception at a base station are to be understood as referring to a particular TRP of the base station.

In some implementations that support positioning of UEs, a network entity or base station may not support wireless access by UEs (e.g., may not support data, voice, and/or signaling connections for UEs), but may instead transmit reference signals to UEs to be measured by the UEs, and/or may receive and measure signals transmitted by the UEs. Such a base station may be referred to as a positioning beacon (e.g., when transmitting signals to UEs) and/or as a location measurement unit (e.g., when receiving and measuring signals from UEs).

As described herein, a node (which may be referred to as a node, a network node, a network entity, or a wireless node) may include, be, or be included in (e.g., be a component of) a base station (e.g., any base station described herein), a UE (e.g., any UE described herein), a network controller, an apparatus, a device, a computing system, an integrated access and backhauling (IAB) node, a distributed unit (DU), a central unit (CU), a remote/radio unit (RU) (which may also be referred to as a remote radio unit (RRU)), and/or another processing entity configured to perform any of the techniques described herein. For example, a network node may be a UE. As another example, a network node may be a base station or network entity. As another example, a first network node may be configured to communicate with a second network node or a third network node. In one aspect of this example, the first network node may be a UE, the second network node may be a base station, and the third network node may be a UE. In another aspect of this example, the first network node may be a UE, the second network node may be a base station, and the third network node may be a base station. In yet other aspects of this example, the first, second, and third network nodes may be different relative to these examples. Similarly, reference to a UE, base station, apparatus, device, computing system, or the like may include disclosure of the UE, base station, apparatus, device, computing system, or the like being a network node. For example, disclosure that a UE is configured to receive information from a base station also discloses that a first network node is configured to receive information from a second network node. Consistent with this disclosure, once a specific example is broadened in accordance with this disclosure (e.g., a UE is configured to receive information from a base station also discloses that a first network node is configured to receive information from a second network node), the broader example of the narrower example may be interpreted in the reverse, but in a broad open-ended way. In the example above where a UE is configured to receive information from a base station also discloses that a first network node is configured to receive information from a second network node, the first network node may refer to a first UE, a first base station, a first apparatus, a first device, a first computing system, a first set of one or more one or more components, a first processing entity, or the like configured to receive the information; and the second network node may refer to a second UE, a second base station, a second apparatus, a second device, a second computing system, a second set of one or more components, a second processing entity, or the like.

As described herein, communication of information (e.g., any information, signal, or the like) may be described in various aspects using different terminology. Disclosure of one communication term includes disclosure of other communication terms. For example, a first network node may be described as being configured to transmit information to a second network node. In this example and consistent with this disclosure, disclosure that the first network node is configured to transmit information to the second network node includes disclosure that the first network node is configured to provide, send, output, communicate, or transmit information to the second network node. Similarly, in this example and consistent with this disclosure, disclosure that the first network node is configured to transmit information to the second network node includes disclosure that the second network node is configured to receive, obtain, or decode the information that is provided, sent, output, communicated, or transmitted by the first network node.

An RF signal comprises an electromagnetic wave of a given frequency that transports information through the space between a transmitter and a receiver. As used herein, a transmitter may transmit a single "RF signal" or multiple "RF signals" to a receiver. However, the receiver may receive multiple "RF signals" corresponding to each transmitted RF signal due to the propagation characteristics of RF signals through multipath channels. The same transmitted RF signal on different paths between the transmitter and receiver may be referred to as a "multipath" RF signal. As used herein, an RF signal may also be referred to as a "wireless signal" or simply a "signal" where it is clear from the context that the term "signal" refers to a wireless signal or an RF signal.

Various aspects of the systems and techniques described herein will be discussed below with respect to the figures. According to various aspects, FIG. 1 illustrates an example of a wireless communications system 100. The wireless communications system 100 (e.g., which may also be referred to as a wireless wide area network (WWAN)) can include various base stations 102 and various UEs 104. In some aspects, the base stations 102 may also be referred to as "network entities" or "network nodes." One or more of the base stations 102 can be implemented in an aggregated or monolithic base station architecture. Additionally, or alternatively, one or more of the base stations 102 can be implemented in a disaggregated base station architecture, and may include one or more of a central unit (CU), a distributed unit (DU), a radio unit (RU), a Near-Real Time (Near-RT) RAN Intelligent Controller (RIC), or a Non-Real Time (Non-RT) RIC. The base stations 102 can include macro cell base stations (e.g., high power cellular base stations) and/or small cell base stations (e.g., low power cellular base stations). In an aspect, the macro cell base station may include eNBs and/or ng-eNBs where the wireless communications system 100 corresponds to a long-term evolution (LTE) network, or gNBs where the wireless communications system 100 corresponds to a NR network, or a combination of both, and the small cell base stations may include femtocells, picocells, microcells, etc.

The base stations 102 may collectively form a RAN and interface with a core network 170 (e.g., an evolved packet core (EPC) or a 5G core (5GC)) through backhaul links 122, and through the core network 170 to one or more location servers 172 (e.g., which may be part of core network 170 or may be external to core network 170). In addition to other functions, the base stations 102 may perform functions that relate to one or more of transferring user data, radio channel ciphering and deciphering, integrity protection, header compression, mobility control functions (e.g., handover, dual connectivity), inter-cell interference coordination, connection setup and release, load balancing, distribution for non-access stratum (NAS) messages, NAS node selection, synchronization, RAN sharing, multimedia broadcast multicast service (MBMS), subscriber and equipment trace, RAN information management (RIM), paging, positioning, and delivery of warning messages. The base stations 102 may communicate with each other directly or indirectly (e.g., through the EPC or 5GC) over backhaul links 134, which may be wired and/or wireless.

The base stations 102 may wirelessly communicate with the UEs 104. Each of the base stations 102 may provide communication coverage for a respective geographic coverage area 110. In an aspect, one or more cells may be supported by a base station 102 in each coverage area 110. A "cell" is a logical communication entity used for communication with a base station (e.g., over some frequency resource, referred to as a carrier frequency, component carrier, carrier, band, or the like), and may be associated with an identifier (e.g., a physical cell identifier (PCI), a virtual cell identifier (VCI), a cell global identifier (CGI)) for distinguishing cells operating via the same or a different carrier frequency. In some cases, different cells may be configured according to different protocol types (e.g., machine-type communication (MTC), narrowband IoT (NB-IoT), enhanced mobile broadband (eMBB), or others) that may provide access for different types of UEs. Because a cell is supported by a specific base station, the term "cell" may refer to either or both of the logical communication entity and the base station that supports it, depending on the context. In addition, because a TRP is typically the physical transmission point of a cell, the terms "cell" and "TRP" may be used interchangeably. In some cases, the term "cell" may also refer to a geographic coverage area of a base station (e.g., a sector), insofar as a carrier frequency can be detected and used for communication within some portion of geographic coverage areas 110.

While neighboring macro cell base station 102 geographic coverage areas 110 may partially overlap (e.g., in a handover region), some of the geographic coverage areas 110 may be substantially overlapped by a larger geographic coverage area 110. For example, a small cell base station 102' may have a coverage area 110' that substantially overlaps with the coverage area 110 of one or more macro cell base stations 102. A network that includes both small cell and macro cell base stations may be known as a heterogeneous network. A heterogeneous network may also include home eNBs (HeNBs), which may provide service to a restricted group known as a closed subscriber group (CSG).

The communication links 120 between the base stations 102 and the UEs 104 may include uplink (e.g., also referred to as reverse link) transmissions from a UE 104 to a base station 102 and/or downlink (e.g., also referred to as forward link) transmissions from a base station 102 to a UE 104. The communication links 120 may use MIMO antenna technology, including spatial multiplexing, beamforming, and/or transmit diversity. The communication links 120 may be provided using one or more carrier frequencies. Allocation of carriers may be asymmetric with respect to downlink and uplink (e.g., a greater or lesser quantity of carriers may be allocated for downlink than for uplink).

Beamforming, which may also be referred to as spatial filtering, directional transmission, or directional reception, is a signal processing technique that may be used at a transmitting device or a receiving device (e.g., one or more of the base stations 102, UEs 104, etc.) to shape or steer an antenna beam (e.g., a transmit beam, a receive beam) along a spatial path between the transmitting device and the receiving device. Beamforming may be implemented based on combining the signals communicated via antenna elements of an antenna array such that some signals propagating at particular orientations with respect to an antenna array experience constructive interference while others experience destructive interference. The adjustment of signals communicated via the antenna elements may include a transmitting device or a receiving device applying amplitude offsets, phase offsets, or both to signals carried via the antenna elements associated with the device. The adjustments associated with each of the antenna elements may be defined by a beamforming weight set associated with a particular orientation (e.g., with respect to the antenna array of the transmitting device or receiving device, or with respect to some other orientation).

A transmitting device and/or a receiving device (e.g., such as one or more of base stations 102 and/or UEs 104) may use beam sweeping techniques as part of beam forming operations. For example, a base station 102 (e.g., or other transmitting device) may use multiple antennas or antenna arrays (e.g., antenna panels) to conduct beamforming operations for directional communications with a UE 104 (e.g., or other receiving device). Some signals (e.g., synchronization signals, reference signals, beam selection signals, or other control signals) may be transmitted by base station 102 (or other transmitting device) multiple times in different directions. For example, the base station 102 may transmit a signal according to different beamforming weight sets associated with different directions of transmission. Transmissions in different beam directions may be used to identify (e.g., by a transmitting device, such as a base station 102, or by a receiving device, such as a UE 104) a beam direction for later transmission or reception by the base station 102.

Some signals, such as data signals associated with a particular receiving device, may be transmitted by a base station 102 in a single beam direction (e.g., a direction associated with the receiving device, such as a UE 104). In some examples, the beam direction associated with transmissions along a single beam direction may be determined based on a signal that was transmitted in one or more beam directions. For example, a UE 104 may receive one or more of the signals transmitted by the base station 102 in different directions and may report to the base station 104 an indication of the signal that the UE 104 received with a highest signal quality or an otherwise acceptable signal quality.

In some examples, transmissions by a device (e.g., by a base station 102 or a UE 104) may be performed using multiple beam directions, and the device may use a combination of digital precoding or radio frequency beamforming to generate a combined beam for transmission (e.g., from a base station 102 to a UE 104, from a transmitting device to a receiving device, etc.). The UE 104 may report feedback that indicates precoding weights for one or more beam directions, and the feedback may correspond to a configured number of beams across a system bandwidth or one or more sub-bands. The base station 102 may transmit a reference signal (e.g., a cell-specific reference signal (CRS), a channel state information reference signal (CSI-RS), etc.), which may be precoded or unprecoded. The UE 104 may provide feedback for beam selection, which may be a precoding matrix indicator (PMI) or codebook-based feedback (e.g., a multi-panel type codebook, a linear combination type codebook, a port selection type codebook). Although these techniques are described with reference to signals transmitted in one or more directions by a base station 102, a UE 104 may employ similar techniques for transmitting signals multiple times in different directions (e.g., for identifying a beam direction for subsequent transmission or reception by the UE 104) or for transmitting a signal in a single direction (e.g., for transmitting data to a receiving device).

A receiving device (e.g., a UE 104) may try multiple receive configurations (e.g., directional listening) when receiving various signals from the base station 102, such as synchronization signals, reference signals, beam selection signals, or other control signals. For example, a receiving device may try multiple receive directions by receiving via different antenna subarrays, by processing received signals according to different antenna subarrays, by receiving according to different receive beamforming weight sets (e.g., different directional listening weight sets) applied to signals received at multiple antenna elements of an antenna array, or by processing received signals according to different receive beamforming weight sets applied to signals received at multiple antenna elements of an antenna array, any of which may be referred to as "listening" according to different receive configurations or receive directions. In some examples, a receiving device may use a single receive configuration to receive along a single beam direction (e.g., when receiving a data signal). The single receive configuration may be aligned in a beam direction determined based on listening according to different receive configuration directions (e.g., a beam direction determined to have a highest signal strength, highest signal-to-noise ratio (SNR), or otherwise acceptable signal quality based on listening according to multiple beam directions).

The wireless communications system 100 may further include a WLAN AP 150 in communication with WLAN stations (STAs) 152 via communication links 154 in an unlicensed frequency spectrum (e.g., 5 Gigahertz (GHz)). When communicating in an unlicensed frequency spectrum, the WLAN STAs 152 and/or the WLAN AP 150 may perform a clear channel assessment (CCA) or listen before talk (LBT) procedure prior to communicating in order to determine whether the channel is available. In some examples, the wireless communications system 100 can include devices (e.g., UEs, etc.) that communicate with one or more UEs 104, base stations 102, APs 150, etc., utilizing the ultra-wideband (UWB) spectrum. The UWB spectrum can range from 3.1 to 10.5 GHZ.

The small cell base station 102' may operate in a licensed and/or an unlicensed frequency spectrum. When operating in an unlicensed frequency spectrum, the small cell base station 102' may employ LTE or NR technology and use the same 5 GHz unlicensed frequency spectrum as used by the WLAN AP 150. The small cell base station 102', employing LTE and/or 5G in an unlicensed frequency spectrum, may boost coverage to and/or increase capacity of the access network. NR in unlicensed spectrum may be referred to as NR-U. LTE in an unlicensed spectrum may be referred to as LTE-U, licensed assisted access (LAA), or MulteFire.

The wireless communications system 100 may further include a millimeter wave (mmW) base station 180 that may operate in mmW frequencies and/or near mmW frequencies in communication with a UE 182. The mmW base station 180 may be implemented in an aggregated or monolithic base station architecture, or alternatively, in a disaggregated base station architecture (e.g., including one or more of a CU, a DU, a RU, a Near-RT RIC, or a Non-RT RIC). Extremely high frequency (EHF) is part of the RF in the electromagnetic spectrum. EHF has a range of 30 GHz to 300 GHZ and a wavelength between 1 millimeter and 10 millimeters. Radio waves in this band may be referred to as a millimeter wave. Near mmW may extend down to a frequency of 3 GHZ with a wavelength of 100 millimeters. The super high frequency (SHF) band extends between 3 GHz and 30 GHz, also referred to as centimeter wave. Communications using the mmW and/or near mmW radio frequency band have high path loss and a relatively short range. The mmW base station 180 and the UE 182 may utilize beamforming (e.g., transmit and/or receive) over an mmW communication link 184 to compensate for the extremely high path loss and short range. Further, it will be appreciated that in alternative configurations, one or more base stations 102 may also transmit using mmW or near mmW and beamforming. Accordingly, it will be appreciated that the foregoing illustrations are merely examples and should not be construed to limit the various aspects disclosed herein.

In some aspects relating to 5G, the frequency spectrum in which wireless network nodes or entities (e.g., base stations 102/180, UEs 104/182) operate is divided into multiple frequency ranges, FR1 (e.g., from 450 to 6,000 Megahertz (MHz)), FR2 (e.g., from 24,250 to 52,600 MHZ), FR3 (e.g., above 52,600 MHZ), and FR4 (e.g., between FR1 and FR2). In a multi-carrier system, such as 5G, one of the carrier frequencies is referred to as the "primary carrier" or "anchor carrier" or "primary serving cell" or "PCell," and the remaining carrier frequencies are referred to as "secondary carriers" or "secondary serving cells" or "SCells." In carrier aggregation, the anchor carrier is the carrier operating on the primary frequency (e.g., FR1) utilized by a UE 104/182 and the cell in which the UE 104/182 either performs the initial radio resource control (RRC) connection establishment procedure or initiates the RRC connection re-establishment procedure. The primary carrier carries all common and UE-specific control channels and may be a carrier in a licensed frequency (however, this is not always the case). A secondary carrier is a carrier operating on a second frequency (e.g., FR2) that may be configured once the RRC connection is established between the UE 104 and the anchor carrier and that may be used to provide additional radio resources. In some cases, the secondary carrier may be a carrier in an unlicensed frequency. The secondary carrier may contain only necessary signaling information and signals, for example, those that are UE-specific may not be present in the secondary carrier, since both primary uplink and downlink carriers are typically UE-specific. This means that different UEs 104/182 in a cell may have different downlink primary carriers. The same is true for the uplink primary carriers. The network is able to change the primary carrier of any UE 104/182 at any time. This is done, for example, to balance the load on different carriers. Because a "serving cell" (e.g., whether a PCell or an SCell) corresponds to a carrier frequency and/or component carrier over which some base station is communicating, the term "cell," "serving cell," "component carrier," "carrier frequency," and the like can be used interchangeably.

For example, still referring to FIG. 1, one of the frequencies utilized by the macro cell base stations 102 may be an anchor carrier (or "PCell") and other frequencies utilized by the macro cell base stations 102 and/or the mmW base station 180 may be secondary carriers ("SCells"). In carrier aggregation, the base stations 102 and/or the UEs 104 may use spectrum up to Y MHz (e.g., 5, 10, 15, 20, 100 MHZ) bandwidth per carrier up to a total of Yx MHZ (e.g., x component carriers) for transmission in each direction. The component carriers may or may not be adjacent to each other on the frequency spectrum. Allocation of carriers may be asymmetric with respect to the downlink and uplink (e.g., a greater or lesser quantity of carriers may be allocated for downlink than for uplink). The simultaneous transmission and/or reception of multiple carriers enables the UE 104/182 to significantly increase its data transmission and/or reception rates. For example, two 20 MHz aggregated carriers in a multi-carrier system would theoretically lead to a two-fold increase in data rate (e.g., 40 MHz), compared to that attained by a single 20 MHz carrier.

In order to operate on multiple carrier frequencies, a base station 102 and/or a UE 104 can be equipped with multiple receivers and/or transmitters. For example, a UE 104 may have two receivers, "Receiver 1" and "Receiver 2," where "Receiver 1" is a multi-band receiver that can be tuned to band (e.g., carrier frequency) 'X' or band 'Y,' and "Receiver 2" is a one-band receiver tunable to band 'Z' only. In this example, if the UE 104 is being served in band 'X,' band 'X' would be referred to as the PCell or the active carrier frequency, and "Receiver 1" would need to tune from band 'X' to band 'Y' (e.g., an SCell) in order to measure band 'Y' (and vice versa). In contrast, whether the UE 104 is being served in band 'X' or band 'Y,' because of the separate "Receiver 2," the UE 104 can measure band 'Z' without interrupting the service on band 'X' or band 'Y.'

The wireless communications system 100 may further include a UE 164 that may communicate with a macro cell base station 102 over a communication link 120 and/or the mmW base station 180 over an mmW communication link 184. For example, the macro cell base station 102 may support a PCell and one or more SCells for the UE 164 and the mmW base station 180 may support one or more SCells for the UE 164.

The wireless communications system 100 may further include one or more UEs, such as UE 190, that connects indirectly to one or more communication networks via one or more device-to-device (D2D) peer-to-peer (P2P) links (e.g., referred to as "sidelinks"). In the example of FIG. 1, UE 190 has a D2D P2P link 192 with one of the UEs 104 connected to one of the base stations 102 (e.g., through which UE 190 may indirectly obtain cellular connectivity) and a D2D P2P link 194 with WLAN STA 152 connected to the WLAN AP 150 (e.g., through which UE 190 may indirectly obtain WLAN-based Internet connectivity). In an example, the D2D P2P links 192 and 194 may be supported with any well-known D2D RAT, such as LTE Direct (LTE-D), Wi-Fi Direct (Wi-Fi-D), Bluetooth®, and so on.

Figure 2:
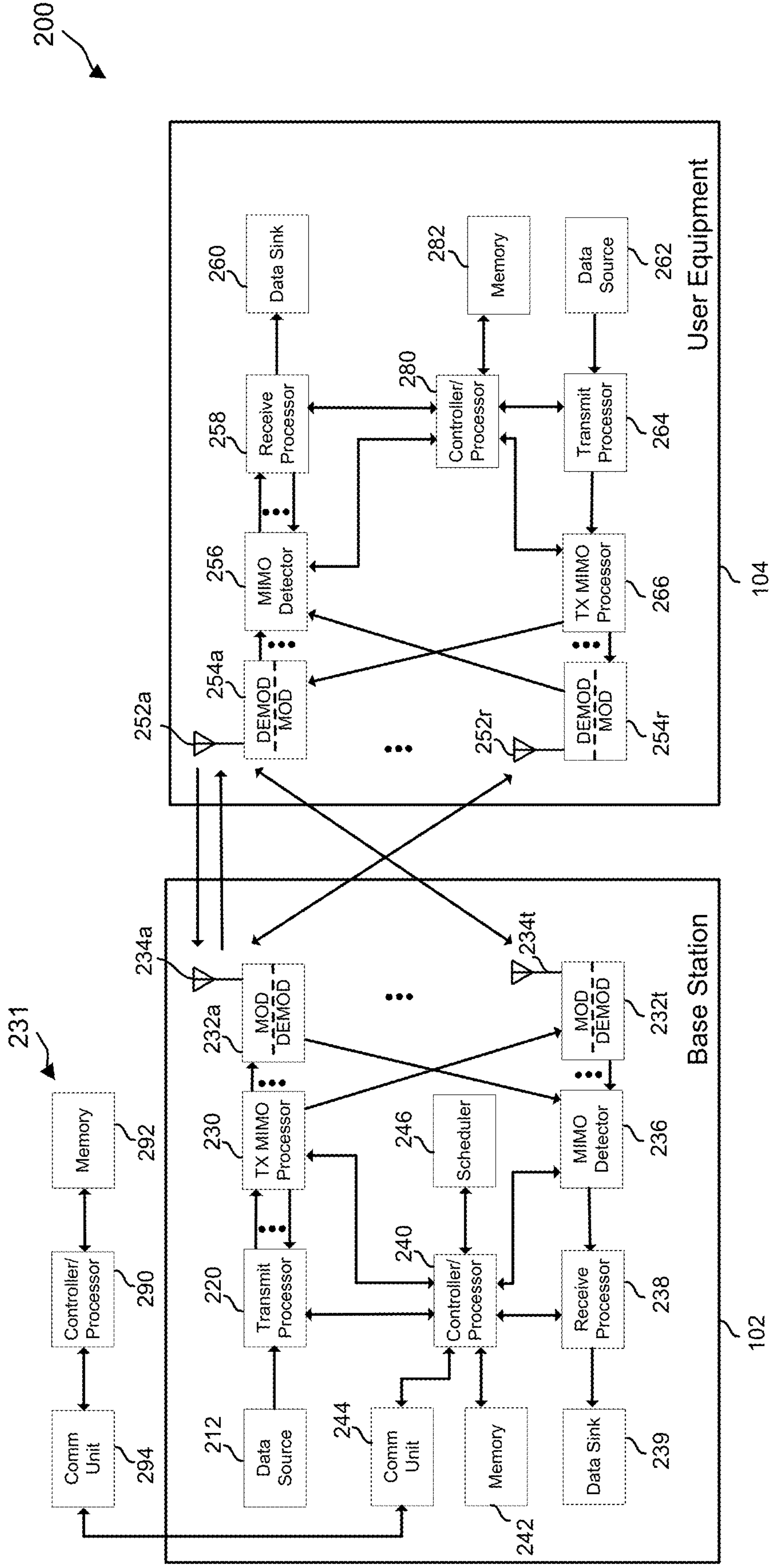
FIG. 2 is a diagram illustrating a design of a base station and a User Equipment (UE) device that enable transmission and processing of signals exchanged between the UE and the base station, in accordance with some examples.

FIG. 2 illustrates a block diagram of an example architecture 200 of a base station 102 and a UE 104 that enables transmission and processing of signals exchanged between the UE and the base station, in accordance with some aspects of the present disclosure. Example architecture 200 includes components of a base station 102 and a UE 104, which may be one of the base stations 102 and one of the UEs 104 illustrated in FIG. 1. Base station 102 may be equipped with T antennas 234*a* through 234*t*, and UE 104 may be equipped with R antennas 252*a* through 252*r*, where in general $T \geq 1$ and $R \geq 1$.

At base station 102, a transmit processor 220 may receive data from a data source 212 for one or more UEs, select one or more modulation and coding schemes (MCS) for each UE based on channel quality indicators (CQIs) received from the UE, process (e.g., encode and modulate) the data for each UE based on the MCS(s) selected for the UE, and provide data symbols for all UEs. Transmit processor 220 may also process system information (e.g., for semi-static resource partitioning information (SRPI) and/or the like) and control information (e.g., CQI requests, grants, upper layer signaling, and/or the like) and provide overhead symbols and control symbols. Transmit processor 220 may also generate reference symbols for reference signals (e.g., the cell-specific reference signal (CRS)) and synchronization signals (e.g., the primary synchronization signal (PSS) and secondary synchronization signal (SSS)). A transmit (TX) multiple-input multiple-output (MIMO) processor 230 may perform spatial processing (e.g., precoding) on the data symbols, the control symbols, the overhead symbols, and/or the reference symbols, if applicable, and may provide T output symbol streams to T modulators (MODs) 232*a* through 232*t*. The modulators 232*a* through 232*t* are shown as a combined modulator-demodulator (MOD-DEMOD). In some cases, the modulators and demodulators can be separate components. Each modulator of the modulators 232*a* to 232*t* may process a respective output symbol stream (e.g., for an orthogonal frequency-division multiplexing (OFDM) scheme and/or the like) to obtain an output sample stream. Each modulator of the modulators 232*a* to 232*t* may further process (e.g., convert to analog, amplify, filter, and upconvert) the output sample stream to obtain a downlink signal. T downlink signals may be transmitted from modulators 232*a* to 232*t* via T antennas 234*a* through 234*t*, respectively. According to certain aspects described in more detail below, the synchronization signals can be generated with location encoding to convey additional information.

At UE 104, antennas 252*a* through 252*r* may receive the downlink signals from base station 102 and/or other base stations and may provide received signals to one or more demodulators (DEMODs) 254*a* through 254*r*, respectively. The demodulators 254*a* through 254*r* are shown as a combined modulator-demodulator (MOD-DEMOD). In some cases, the modulators and demodulators can be separate components. Each demodulator of the demodulators 254*a* through 254*r* may condition (e.g., filter, amplify, downconvert, and digitize) a received signal to obtain input samples. Each demodulator of the demodulators 254*a* through 254*r* may further process the input samples (e.g., for OFDM and/or the like) to obtain received symbols. A MIMO detector 256 may obtain received symbols from all R demodulators 254*a* through 254*r*, perform MIMO detection on the received symbols if applicable, and provide detected symbols. A receive processor 258 may process (e.g., demodulate and decode) the detected symbols, provide decoded data for UE 104 to a data sink 260, and provide decoded control information and system information to a controller/processor 280. A channel processor may determine reference signal received power (RSRP), received signal strength indicator (RSSI), reference signal received quality (RSRQ), channel quality indicator (CQI), and/or the like.

On the uplink, at UE 104, a transmit processor 264 may receive and process data from a data source 262 and control information (e.g., for reports comprising RSRP, RSSI, RSRQ. CQI, and/or the like) from controller/processor 280. Transmit processor 264 may also generate reference symbols for one or more reference signals (e.g., based on a beta value or a set of beta values associated with the one or more reference signals). The symbols from transmit processor 264 may be precoded by a TX-MIMO processor 266, further processed by modulators 254*a* through 254*r* (e.g., for DFT-s-OFDM, CP-OFDM, and/or the like), and transmitted to base station 102. At base station 102, the uplink signals from UE 104 and other UEs may be received by antennas 234*a* through 234*t*, processed by demodulators 232*a* through 232*t*, detected by a MIMO detector 236 (e.g., if applicable), and further processed by a receive processor 238 to obtain decoded data and control information sent by UE 104. Receive processor 238 may provide the decoded data to a data sink 239 and the decoded control information to controller (e.g., processor) 240. Base station 102 may include communication unit 244 and communicate to a network controller 231 via communication unit 244. Network controller 231 may include communication unit 294, controller/processor 290, and memory 292.

In some aspects, one or more components of UE 104 may be included in a housing. Controller 240 of base station 102, controller/processor 280 of UE 104, and/or any other component(s) of FIG. 2 may perform one or more techniques associated with implicit UCI beta value determination for NR.

Memories 242 and 282 may store data and program codes for the base station 102 and the UE 104, respectively. A scheduler 246 may schedule UEs for data transmission on the downlink, uplink, and/or sidelink.

In some aspects, deployment of communication systems, such as 5G new radio (NR) systems, may be arranged in multiple manners with various components or constituent parts. In a 5G NR system, or network, a network node, a network entity, a mobility element of a network, a radio access network (RAN) node, a core network node, a network element, or a network equipment, such as a base station (BS), or one or more units (or one or more components) performing base station functionality, may be implemented in an aggregated or disaggregated architecture. For example, a BS (e.g., such as a Node B (NB), evolved NB (CNB), NR BS, 5G NB, access point (AP), a transmit receive point (TRP), or a cell, etc.) may be implemented as an aggregated base station (e.g., also known as a standalone BS or a monolithic BS) or a disaggregated base station.

An aggregated base station may be configured to utilize a radio protocol stack that is physically or logically integrated within a single RAN node. A disaggregated base station may be configured to utilize a protocol stack that is physically or logically distributed among two or more units (e.g., such as one or more central or centralized units (CUs), one or more distributed units (DUs), or one or more radio units (RUS)). In some aspects, a CU may be implemented within a RAN node, and one or more DUs may be co-located with the CU, or alternatively, may be geographically or virtually distributed throughout one or multiple other RAN nodes. The DUs may be implemented to communicate with one or more RUs. Each of the CU. DU and RU also can be implemented as virtual units, i.e., a virtual central unit (VCU), a virtual distributed unit (VDU), or a virtual radio unit (VRU).

Base station-type operation or network design may consider aggregation characteristics of base station functionality. For example, disaggregated base stations may be utilized in an integrated access backhaul (IAB) network, an open radio access network (O-RAN (e.g., such as the network configuration sponsored by the O-RAN Alliance)), or a virtualized radio access network (e.g., vRAN, also known as a cloud radio access network (C-RAN)). Disaggregation may include distributing functionality across two or more units at various physical locations, as well as distributing functionality for at least one unit virtually, which can enable flexibility in network design. The various units of the disaggregated base station, or disaggregated RAN architecture, can be configured for wired or wireless communication with at least one other unit.

Figure 3:
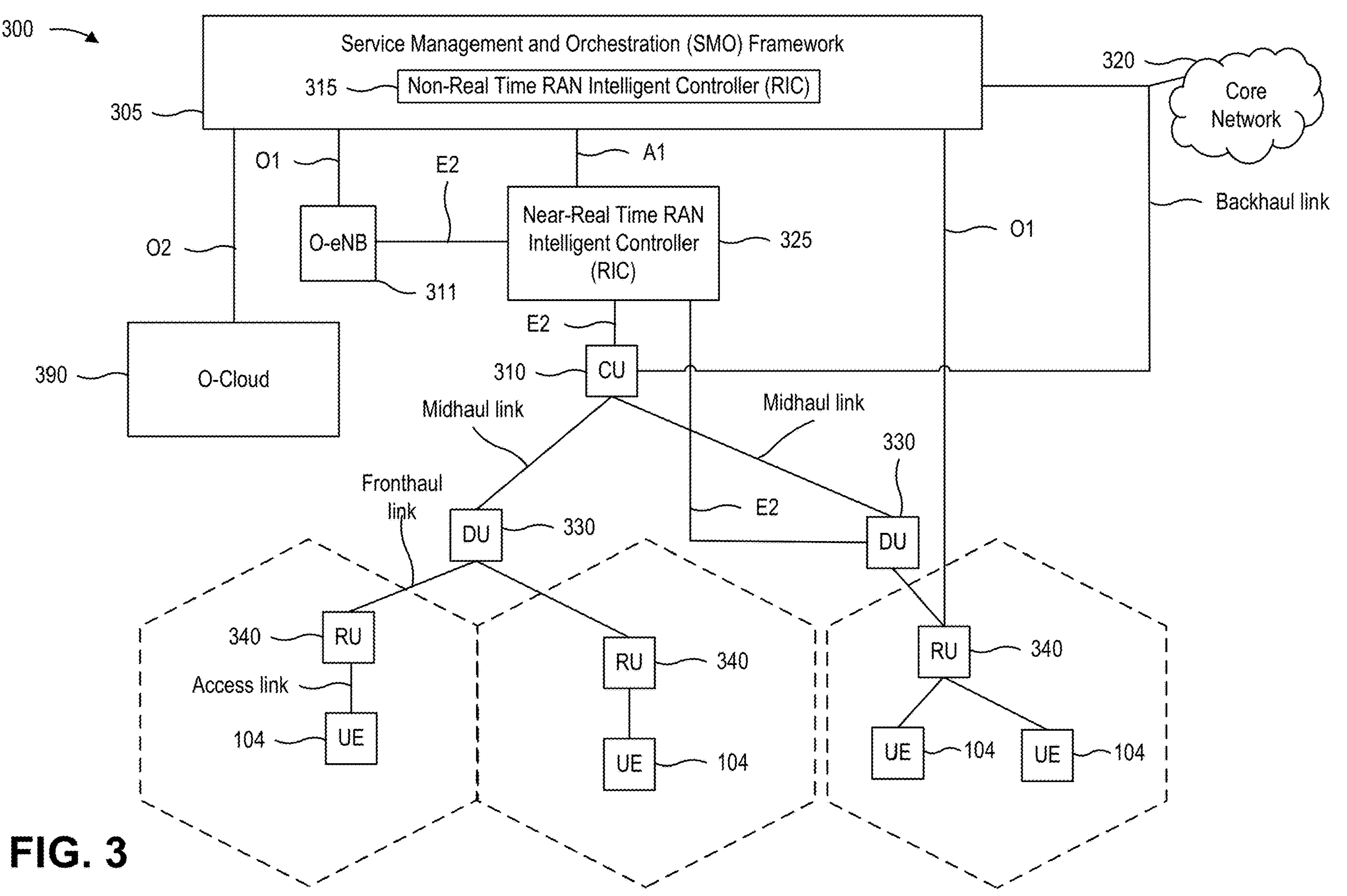
FIG. 3 is a diagram illustrating an example of a disaggregated base station, in accordance with some examples.

FIG. 3 is a diagram illustrating an example disaggregated base station 300 architecture. The disaggregated base station 300 architecture may include one or more central units (CUs) 310 that can communicate directly with a core network 320 via a backhaul link, or indirectly with the core network 320 through one or more disaggregated base station units (e.g., such as a Near-Real Time (Near-RT) RAN Intelligent Controller (RIC) 325 via an E2 link, or a Non-Real Time (Non-RT) RIC 315 associated with a Service Management and Orchestration (SMO) Framework 305, or both). A CU 310 may communicate with one or more distributed units (DUs) 330 via respective midhaul links, such as an F1 interface. The DUs 330 may communicate with one or more radio units (RUS) 340 via respective fronthaul links. The RUs 340 may communicate with respective UEs 104 via one or more radio frequency (RF) access links. In some implementations, the UE 104 may be simultaneously served by multiple RUs 340.

Each of the units (e.g., the CUS 310, the DUs 330, the RUs 340, as well as the Near-RT RICs 325, the Non-RT RICs 315, and the SMO Framework 305) illustrated in FIG. 3 and/or described herein may include one or more interfaces or be coupled to one or more interfaces configured to receive or transmit signals, data, or information (e.g., collectively, signals) via a wired or wireless transmission medium. Each of the units, or an associated processor or controller providing instructions to the communications interfaces of the units, can be configured to communicate with one or more of the other units via the transmission medium. For example, the units can include a wired interface configured to receive or transmit signals over a wired transmission medium to one or more of the other units. Additionally, the units can include a wireless interface, which may include a receiver, a transmitter or transceiver (e.g., such as a radio frequency (RF) transceiver), configured to receive or transmit signals, or both, over a wireless transmission medium to one or more of the other units.

In some aspects, the CU 310 may host one or more higher layer control functions. Such control functions can include radio resource control (RRC), packet data convergence protocol (PDCP), service data adaptation protocol (SDAP), or the like. Each control function can be implemented with an interface configured to communicate signals with other control functions hosted by the CU 310. The CU 310 may be configured to handle user plane functionality (e.g., Central Unit-User Plane (CU-UP)), control plane functionality (e.g., Central Unit-Control Plane (CU-CP)), or a combination thereof. In some implementations, the CU 310 can be logically split into one or more CU-UP units and one or more CU-CP units. The CU-UP unit can communicate bidirectionally with the CU-CP unit via an interface, such as the E1 interface when implemented in an O-RAN configuration. The CU 310 can be implemented to communicate with the DU 330, as necessary, for network control and signaling.

The DU 330 may correspond to a logical unit that includes one or more base station functions to control the operation of one or more RUs 340. In some aspects, the DU 330 may host one or more of a radio link control (RLC) layer, a medium access control (MAC) layer, and one or more high physical (PHY) layers (e.g., such as modules for forward error correction (FEC) encoding and decoding, scrambling, modulation and demodulation, or the like) depending on a functional split, such as those defined by the 3rd Generation Partnership Project (3GPP). In some aspects, the DU 330 may further host one or more low PHY layers. Each layer (or module) can be implemented with an interface configured to communicate signals with other layers (and modules) hosted by the DU 330, or with the control functions hosted by the CU 310.

Lower-layer functionality can be implemented by one or more RUs 340. In some deployments, an RU 340, controlled by a DU 330, may correspond to a logical node that hosts RF processing functions, or low-PHY layer functions (e.g., such as performing fast Fourier transform (FFT), inverse FFT (iFFT), digital beamforming, physical random-access channel (PRACH) extraction and filtering, or the like), or both, based on the functional split, such as a lower layer functional split. In such an architecture, the RU(s) 340 can be implemented to handle over the air (OTA) communication with one or more UEs 104. In some implementations, real-time and non-real-time aspects of control and user plane communication with the RU(s) 340 can be controlled by the corresponding DU 330. In some scenarios, this configuration can enable the DU(s) 330 and the CU 310 to be implemented in a cloud-based RAN architecture, such as a vRAN architecture.

The SMO Framework 305 may be configured to support RAN deployment and provisioning of non-virtualized and virtualized network elements. For non-virtualized network elements, the SMO Framework 305 may be configured to support the deployment of dedicated physical resources for RAN coverage requirements which May be managed via an operations and maintenance interface (e.g., such as an O1 interface). For virtualized network elements, the SMO Framework 305 may be configured to interact with a cloud computing platform (e.g., such as an open cloud (O-Cloud) 390) to perform network element life cycle management (e.g., such as to instantiate virtualized network elements) via a cloud computing platform interface (e.g., such as an O2 interface). Such virtualized network elements can include, but are not limited to, CUs 310, DUs 330, RUS 340, and Near-RT RICs 325. In some implementations, the SMO Framework 305 can communicate with a hardware aspect of a 4G RAN, such as an open eNB (O-eNB) 311, via an O1 interface. Additionally, in some implementations, the SMO Framework 305 can communicate directly with one or more RUs 340 via an O1 interface. The SMO Framework 305 also may include a Non-RT RIC 315 configured to support functionality of the SMO Framework 305.

The Non-RT RIC 315 may be configured to include a logical function that enables non-real-time control and optimization of RAN elements and resources, Artificial Intelligence/Machine Learning (AI/ML) workflows including model training and updates, or policy-based guidance of applications/features in the Near-RT RIC 325. The Non-RT RIC 315 may be coupled to or communicate with (e.g., such as via an A1 interface) the Near-RT RIC 325. The Near-RT RIC 325 may be configured to include a logical function that enables near-real-time control and optimization of RAN elements and resources via data collection and actions over an interface (e.g., such as via an E2 interface) connecting one or more CUs 310, one or more DUs 330, or both, as well as an O-eNB, with the Near-RT RIC 325.

In some implementations, to generate AI/ML models to be deployed in the Near-RT RIC 325, the Non-RT RIC 315 may receive parameters or external enrichment information from external servers. Such information may be utilized by the Near-RT RIC 325 and may be received at the SMO Framework 305 or the Non-RT RIC 315 from non-network data sources or from network functions. In some examples, the Non-RT RIC 315 or the Near-RT RIC 325 may be configured to tune RAN behavior or performance. For example, the Non-RT RIC 315 may monitor long-term trends and patterns for performance and employ AI/ML models to perform corrective actions through the SMO Framework 305 (e.g., such as reconfiguration via O1) or via creation of RAN management policies (e.g., such as A1 policies).

Figure 4:
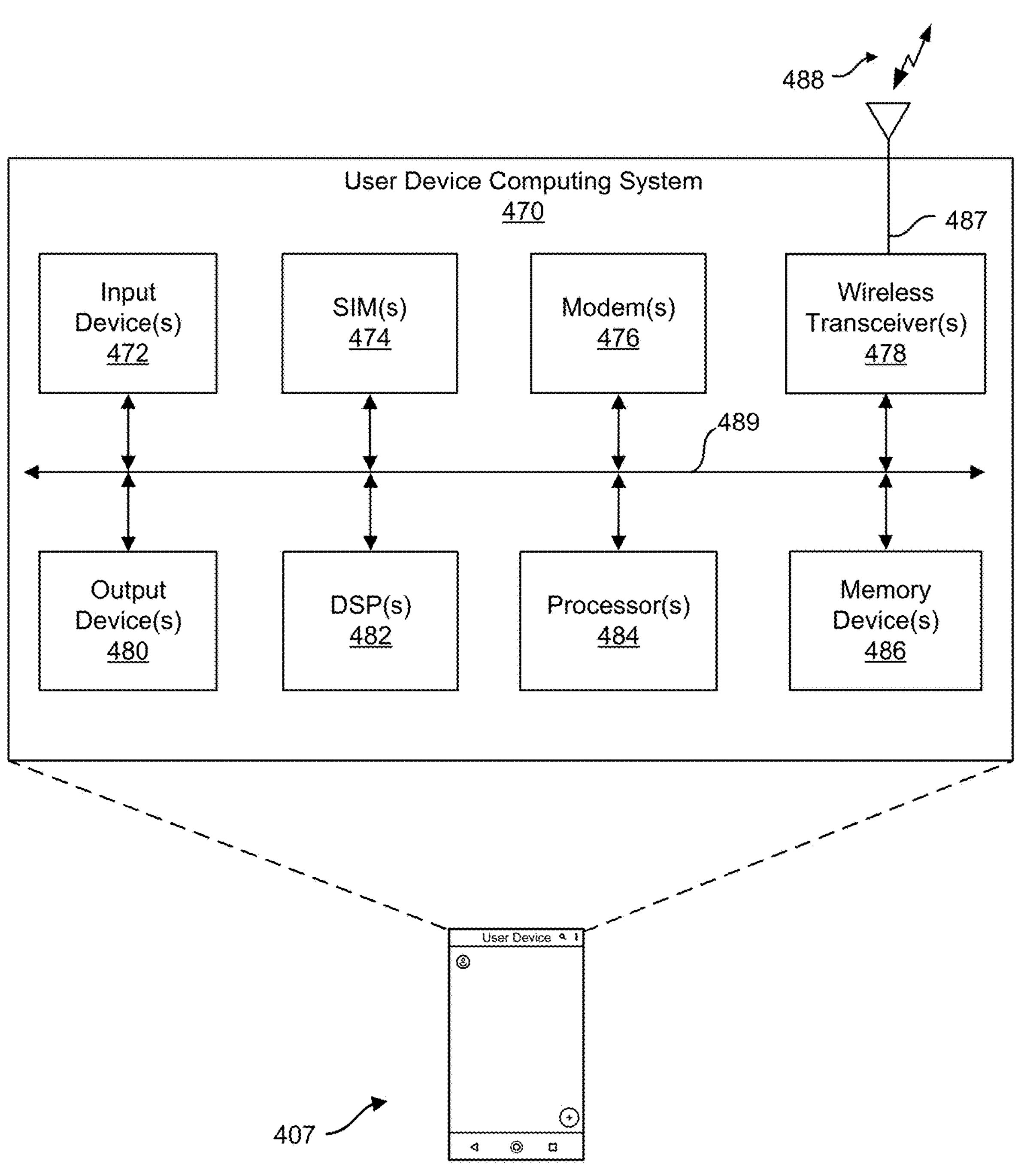
FIG. 4 is a block diagram illustrating components of a user equipment (UE), in accordance with some examples.

FIG. 4 illustrates an example of a computing system 470 of a wireless device 407. The wireless device 407 may include a client device such as a UE (e.g., UE 104, UE 152. UE 190) or other type of device (e.g., a station (STA) configured to communication using a Wi-Fi interface) that may be used by an end-user. For example, the wireless device 407 may include a mobile phone, router, tablet computer, laptop computer, tracking device, wearable device (e.g., a smart watch, glasses, an extended reality (XR) device such as a virtual reality (VR), augmented reality (AR), or mixed reality (MR) device, etc.), Internet of Things (IoT) device, a vehicle, an aircraft, and/or another device that is configured to communicate over a wireless communications network. The computing system 470 includes software and hardware components that may be electrically or communicatively coupled via a bus 489 (e.g., or may otherwise be in communication, as appropriate). For example, the computing system 470 includes one or more processors 484. The one or more processors 484 may include one or more CPUs, ASICS, FPGAs, APs, GPUs, VPUs, NSPs, microcontrollers, dedicated hardware, any combination thereof, and/or other processing device or system. The bus 489 may be used by the one or more processors 484 to communicate between cores and/or with the one or more memory devices 486.

The computing system 470 may also include one or more memory devices 486, one or more digital signal processors (DSPs) 482, one or more SIMs 474, one or more modems 476, one or more wireless transceivers 478, an antenna 487, one or more input devices 472 (e.g., a camera, a mouse, a keyboard, a touch sensitive screen, a touch pad, a keypad, a microphone, and/or the like), and one or more output devices 480 (e.g., a display, a speaker, a printer, and/or the like).

In some aspects, computing system 470 may include one or more radio frequency (RF) interfaces configured to transmit and/or receive RF signals. In some examples, an RF interface may include components such as modem(s) 476, wireless transceiver(s) 478, and/or antennas 487. The one or more wireless transceivers 478 may transmit and receive wireless signals (e.g., signal 488) via antenna 487 from one or more other devices, such as other wireless devices, network devices (e.g., base stations such as eNBs and/or gNBs, Wi-Fi access points (APs) such as routers, range extenders or the like, etc.), cloud networks, and/or the like.

In some examples, the computing system 470 may include multiple antennas or an antenna array that may facilitate simultaneous transmit and receive functionality. Antenna 487 may be an omnidirectional antenna such that radio frequency (RF) signals may be received from and transmitted in all directions. The wireless signal 488 may be transmitted via a wireless network. The wireless network may be any wireless network, such as a cellular or telecommunications network (e.g., 3G, 4G, 5G, etc.), wireless local area network (e.g., a Wi-Fi network), a Bluetooth™ network, and/or other network.

In some examples, the wireless signal 488 may be transmitted directly to other wireless devices using sidelink communications (e.g., using a PC5 interface, using a DSRC interface, etc.). Wireless transceivers 478 may be configured to transmit RF signals for performing sidelink communications via antenna 487 in accordance with one or more transmit power parameters that may be associated with one or more regulation modes. Wireless transceivers 478 may also be configured to receive sidelink communication signals having different signal parameters from other wireless devices.

In some examples, the one or more wireless transceivers 478 may include an RF front end including one or more components, such as an amplifier, a mixer (e.g., also referred to as a signal multiplier) for signal down conversion, a frequency synthesizer (e.g., also referred to as an oscillator) that provides signals to the mixer, a baseband filter, an analog-to-digital converter (ADC), one or more power amplifiers, among other components. The RF front-end may generally handle selection and conversion of the wireless signals 488 into a baseband or intermediate frequency and may convert the RF signals to the digital domain.

In some cases, the computing system 470 may include a coding-decoding device (or CODEC) configured to encode and/or decode data transmitted and/or received using the one or more wireless transceivers 478. In some cases, the computing system 470 may include an encryption-decryption device or component configured to encrypt and/or decrypt data (e.g., according to the AES and/or DES standard) transmitted and/or received by the one or more wireless transceivers 478.

The one or more SIMs 474 may each securely store an international mobile subscriber identity (IMSI) number and related key assigned to the user of the wireless device 407. The IMSI and key may be used to identify and authenticate the subscriber when accessing a network provided by a network service provider or operator associated with the one or more SIMs 474. The one or more modems 476 may modulate one or more signals to encode information for transmission using the one or more wireless transceivers 478. The one or more modems 476 may also demodulate signals received by the one or more wireless transceivers 478 in order to decode the transmitted information. In some examples, the one or more modems 476 may include a Wi-Fi modem, a 4G (or LTE) modem, a 5G (or NR) modem, and/or other types of modems. The one or more modems 476 and the one or more wireless transceivers 478 may be used for communicating data for the one or more SIMs 474.

The computing system 470 may also include (and/or be in communication with) one or more non-transitory machine-readable storage media or storage devices (e.g., one or more memory devices 486), which may include, without limitation, local and/or network accessible storage, a disk drive, a drive array, an optical storage device, a solid-state storage device such as a RAM and/or a ROM, which may be programmable, flash-updateable, and/or the like. Such storage devices may be configured to implement any appropriate data storage, including without limitation, various file systems, database structures, and/or the like.

In various aspects, functions may be stored as one or more computer-program products (e.g., instructions or code) in memory device(s) 486 and executed by the one or more processor(s) 484 and/or the one or more DSPs 482. The computing system 470 may also include software elements (e.g., located within the one or more memory devices 486), including, for example, an operating system, device drivers, executable libraries, and/or other code, such as one or more application programs, which may comprise computer programs implementing the functions provided by various aspects, and/or may be designed to implement methods and/or configure systems, as described herein.

Figure 5:
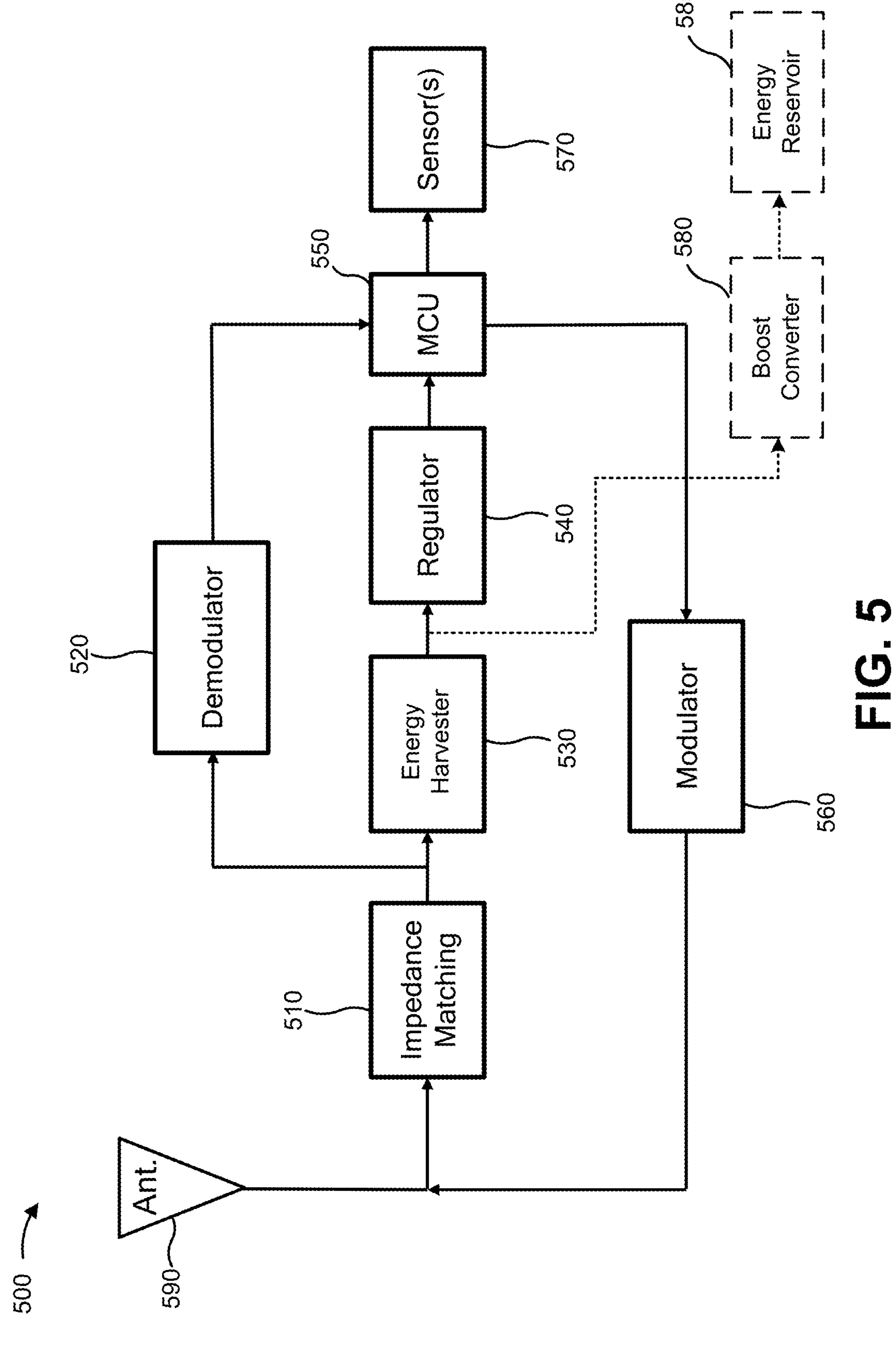
FIG. 5 is a diagram illustrating an example of a radio frequency (RF) energy harvesting device, in accordance with some examples.

FIG. 5 is a diagram illustrating an example of an architecture of a radio frequency (RF) energy harvesting device 500, in accordance with some examples. As will be described in greater depth below, the RF energy harvesting device 500 can harvest RF energy from one or more RF signals received using an antenna 590. As used herein, the term “energy harvesting” may be used interchangeably with “power harvesting.” In some aspects, an “energy harvesting device” can be a device that is capable of performing energy harvesting (EH). For example, as used herein, the term “energy harvesting device” may be used interchangeably with the term “EH-capable device” or “energy harvesting-capable device.” In some aspects, energy harvesting device 500 can be implemented as an Internet-of-Things (IoT) device, can be implemented as a sensor, etc., as will be described in greater depth below. In other examples, energy harvesting device 500 can be implemented as a Radio-Frequency Identification (RFID) tag or various other RFID devices.

The energy harvesting device 500 includes one or more antennas 590 that can be used to transmit and receive one or more wireless signals. For example, energy harvesting device 500 can use antenna 590 to receive one or more downlink signals and to transmit one or more uplink signals. An impedance matching component 510 can be used to match the impedance of antenna 590 to the impedance of one or more (or all) of the receive components included in energy harvesting device 500. In some examples, the receive components of energy harvesting device 500 can include a demodulator 520 (e.g., for demodulating a received downlink signal), an energy harvester 530 (e.g., for harvesting RF energy from the received downlink signal), a regulator 540, a micro-controller unit (MCU) 550, a modulator 560 (e.g., for generating an uplink signal). In some cases, the receive components of energy harvesting device 500 may further include one or more sensors 570.

The downlink signals can be received from one or more transmitters. For example, energy harvesting device 500 may receive a downlink signal from a network node or network entity that is included in a same wireless network as the energy harvesting device 500. In some cases, the network entity can be a base station, gNB, etc., that communicates with the energy harvesting device 500 using a cellular communication network. For example, the cellular communication network can be implemented according to the 3G, 4G, 5G, and/or other cellular standard (e.g., including future standards such as 6G and beyond).

In some cases, energy harvesting device 500 can be implemented as a passive or semi-passive energy harvesting device, which perform passive uplink communication by modulating and reflecting a downlink signal received via antenna 590. A passive or semi-passive energy harvesting device may also be referred to as a passive or semi-passive EH-capable device, respectively. For example, passive and semi-passive energy harvesting devices may be unable to generate and transmit an uplink signal without first receiving a downlink signal that can be modulated and reflected. In other examples, energy harvesting device 500 may be implemented as an active energy harvesting device, which utilizes a powered transceiver to perform active uplink communication. An active energy harvesting device is able to generate and transmit an uplink signal without first receiving a downlink signal (e.g., by using an on-device power source to energize its powered transceiver).

An active or semi-passive energy harvesting device (e.g., also referred to as an active EH-capable device or a semi-passive EH-capable device, respectively) may include one or more energy storage elements 585 (e.g., collectively referred to as an "energy reservoir"). For example, the one or more energy storage elements 585 can include batteries, capacitors, etc. In some examples, the one or more energy storage elements 585 may be associated with a boost converter 580. The boost converter 580 can receive as input at least a portion of the energy harvested by energy harvester 530 (e.g., with a remaining portion of the harvested energy being provided as instantaneous power for operating the energy harvesting device 500). In some aspects, the boost converter 580 may be a step-up converter that steps up voltage from its input to its output (e.g., and steps down current from its input to its output). In some examples, boost converter 580 can be used to step up the harvested energy generated by energy harvester 530 to a voltage level associated with charging the one or more energy storage elements 585. An active or semi-passive energy harvesting device may include one or more energy storage elements 585 and may include one or more boost converters 580. A quantity of energy storage elements 585 may be the same as or different than a quantity of boost converters 580 included in an active or semi-passive energy harvesting device.

A passive energy harvesting device (e.g., also referred to as a "passive EH-capable device") does not include an energy storage element 585 or other on-device power source. For example, a passive energy harvesting device may be powered using only RF energy harvested from a downlink signal (e.g., using energy harvester 530). As mentioned previously, a semi-passive energy harvesting device can include one or more energy storage elements 585 and/or other on-device power sources. The energy storage element 585 of a semi-passive energy harvesting device can be used to augment or supplement the RF energy harvested from a downlink signal. In some cases, the energy storage element 585 of a semi-passive energy harvesting device may store insufficient energy to transmit an uplink communication without first receiving a downlink communication (e.g., minimum transmit power of the semi-passive device>capacity of the energy storage element). An active energy harvesting device can include one or more energy storage elements 585 and/or other on-device power sources that can power uplink communication without using supplemental harvested RF energy (e.g., minimum transmit power of the active device<capacity of the energy storage element). The energy storage element(s) 585 included in an active energy harvesting device and/or a semi-passive energy harvesting device can be charged using harvested RF energy.

As mentioned above, passive and semi-passive energy harvesting devices transmit uplink communications by performing backscatter modulation to modulate and reflect a received downlink signal. The received downlink signal is used to provide both electrical power (e.g., to perform demodulation, local processing, and modulation) and a carrier wave for uplink communication (e.g., the reflection of the downlink signal). For example, a portion of the downlink signal will be backscattered as an uplink signal and a remaining portion of the downlinks signal can be used to perform energy harvesting.

Active energy harvesting devices can transmit uplink communications without performing backscatter modulation and without receiving a corresponding downlink signal (e.g., an active energy harvesting device includes an energy storage element to provide electrical power and includes a powered transceiver to generate a carrier wave for an uplink communication). In the absence of a downlink signal, passive and semi-passive energy harvesting devices cannot transmit an uplink signal (e.g., passive communication). Active energy harvesting devices do not depend on receiving a downlink signal in order to transmit an uplink signal and can transmit an uplink signal as desired (e.g., active communication).

In examples in which the energy harvesting device 500 is implemented as a passive or semi-passive energy harvesting device, a continuous carrier wave downlink signal may be received using antenna 590 and modulated (e.g., re-modulated) for uplink communication. In some cases, a modulator 560 can be used to modulate the reflected (e.g., backscattered) portion of the downlink signal. For example, the continuous carrier wave may be a continuous sinusoidal wave (e.g., sine or cosine waveform) and modulator 560 can perform modulation based on varying one or more of the amplitude and the phase of the backscattered reflection. Based on modulating the backscattered reflection, modulator 560 can encode digital symbols (e.g., such as binary symbols or more complex systems of symbols) indicative of an uplink communication or data message. For example, the uplink communication may be indicative of sensor data or other information associated with the one or more sensors 570 included in energy harvesting device 500.

As mentioned previously, impedance matching component 510 can be used to match the impedance of antenna 590 to the receive components of energy harvesting device 500 when receiving the downlink signal (e.g., when receiving the continuous carrier wave). In some examples, during backscatter operation (e.g., when transmitting an uplink signal), modulation can be performed based on intentionally mismatching the antenna input impedance to cause a portion of the incident downlink signal to be scattered back. The phase and amplitude of the backscattered reflection may be determined based on the impedance loading on the antenna 590. Based on varying the antenna impedance (e.g., varying the impedance mismatch between antenna 590 and the remaining components of energy harvesting device 500), digital symbols and/or binary information can be encoded (e.g., modulated) onto the backscattered reflection. Varying the antenna impedance to modulate the phase and/or amplitude of the backscattered reflection can be performed using modulator 560.

As illustrated in FIG. 5, a portion of a downlink signal received using antenna 590 can be provided to a demodulator 520, which performs demodulation and provides a downlink communication (e.g., carried or modulated on the downlink signal) to a micro-controller unit (MCU) 550 or other processor included in the energy harvesting device 500. A remaining portion of the downlink signal received using antenna 590 can be provided to energy harvester 530, which harvests RF energy from the downlink signal. For example, energy harvester 530 can harvest RF energy based on performing AC-to-DC (alternating current-to-direct current) conversion, wherein an AC current is generated from the sinusoidal carrier wave of the downlink signal and the converted DC current is used to power the energy harvesting device 500. In some aspects, energy harvester 530 can include one or more rectifiers for performing AC-to-DC conversion. A rectifier can include one or more diodes or thin-film transistors (TFTs). In one illustrative example, energy harvester 530 can include one or more Schottky diode-based rectifiers. In some cases, energy harvester 530 can include one or more TFT-based rectifiers.

The output of the energy harvester 530 is a DC current generated from (e.g., harvested from) the portion of the downlink signal provided to the energy harvester 530. In some aspects, the DC current output of energy harvester 530 may vary with the input provided to the energy harvester 530. For example, an increase in the input current to energy harvester 530 can be associated with an increase in the output DC current generated by energy harvester 530. In some cases, MCU 550 may be associated with a narrow band of acceptable DC current values. Regulator 540 can be used to remove or otherwise decrease variation(s) in the DC current generated as output by energy harvester 530. For example, regulator 540 can remove or smooth spikes (e.g., increases) in the DC current output by energy harvester 530 (e.g., such that the DC current provided as input to MCU 550 by regulator 540 remains below a first threshold). In some cases, regulator 540 can remove or otherwise compensate for drops or decreases in the DC current output by energy harvester 530 (e.g., such that the DC current provided as input to MCU 550 by regulator 540 remains above a second threshold).

In some aspects, the harvested DC current (e.g., generated by energy harvester 530 and regulated upward or downward as needed by regulator 540) can be used to power MCU 550 and one or more additional components included in the energy harvesting device 500. For example, the harvested DC current can additionally be used to power one or more (or all) of the impedance matching component 510, demodulator 520, regulator 540, MCU 550, sensors 570, modulator 560, etc. For example, sensors 570 and modulator 560 can receive at least a portion of the harvested DC current that remains after MCU 550 (e.g., that is not consumed by MCU 550). In some cases, the harvested DC current output by regulator 540 can be provided to MCU 550, modulator 560, and sensors 570 in series, in parallel, or a combination thereof.

In some examples, sensors 570 can be used to obtain sensor data (e.g., such as sensor data associated with an environment in which the energy harvesting device 500 is located). Sensors 570 can include one or more sensors, which may be of a same or different type(s). In some aspects, one or more (or all) of the sensors 570 can be configured to obtain sensor data based on control information included in a downlink signal received using antenna 590. For example, one or more of the sensors 570 can be configured based on a downlink communication obtained based on demodulating a received downlink signal using demodulator 520. In one illustrative example, sensor data can be transmitted based on using modulator 560 to modulate (e.g., vary one or more of amplitude and/or phase of) a backscatter reflection of the continuous carrier wave received at antenna 590. Based on modulating the backscattered reflection, modulator 560 can encode digital symbols (e.g., such as binary symbols or more complex systems of symbols) indicative of an uplink communication or data message. In some examples, modulator 560 can generate an uplink, backscatter modulated signal based on receiving sensor data directly from sensors 570. In some examples, modulator 560 can generate an uplink, backscatter modulated signal based on received sensor data from MCU 550 (e.g., based on MCU 550 receiving sensor data directly from sensors 570).

In some cases, location tracking devices (e.g., tag devices) may be implemented as active devices, semi-passive energy harvesting devices, and passive energy harvesting devices. Tag devices may be used to location and/or track lost or misplaced items. For example, a tag device may be attached to an item by an owner (e.g., user). If the owner then loses or misplaces the item, the owner may then find and/or track a location of the attached tag device to help find the item. For some tag devices, if the item, and attached tag device, is misplaced by the owner, the tag may broadcast an announcement message using a Bluetooth Low Energy (BLE) protocol, the announcement message including a public key associated with the tag device. A nearby relay device, such as a wireless device not associated with the owner, may receive the announcement message and transmit the public key, along with location information associated with the relay device to a cloud service. The owner may then access the cloud service access the location information as a proxy for where the tag device and attached item are located. In some cases, including a public key in a message using BLE may limit a size of the public key that may be used. Additionally, use of a public key may allow for replay attacks to be performed with false location information. Thus, there is a desire for improved location tracking for a tag device. In some cases, tag information including a coded identifier may allow for improved location tracking.

Figure 6:
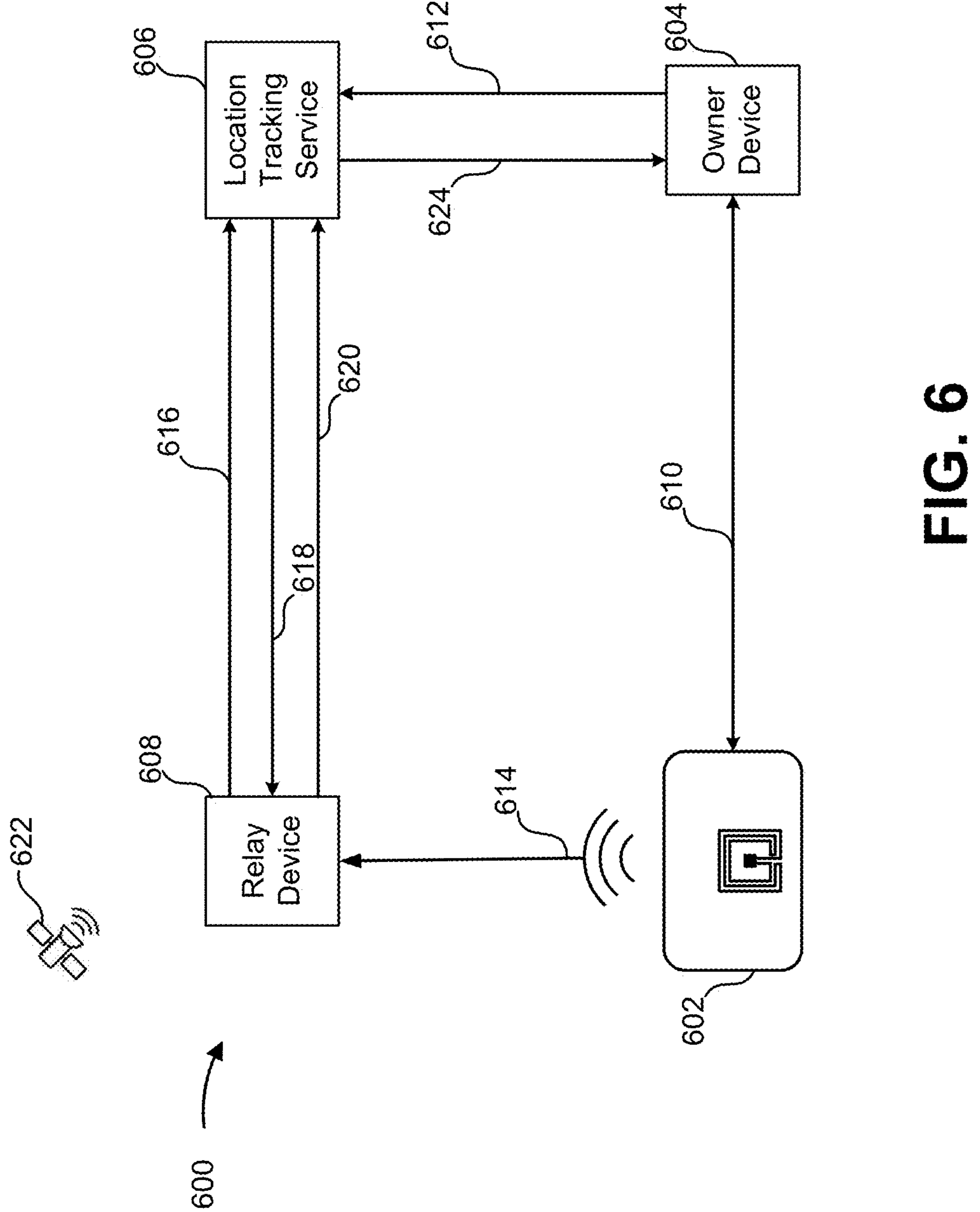
FIG. 6 is a diagram illustrating an example of an environment for improved location tracking for a tag device, in accordance with aspects of the present disclosure.

FIG. 6 is a diagram illustrating an example of an environment 600 for improved location tracking for a tag device, in accordance with aspects of the present disclosure. Environment 600 includes a tag device 602, an owner device 604, a location tracking service 606, and a relay device 608. In some cases, the tag device 602 may be an active tag device (e.g., includes a power source and may or may not be configured for energy harvesting). Initially, the tag device 602 may be associated with the owner device 604 during an onboarding procedure 610. The owner device 604 may be any communication device capable of accessing a location tracking service 606. During the onboarding procedure 610, the tag device 602 may be configured with various information, such as tag name, owner account information, and the like.

In some cases, a private key/public key pair may also be generated. The private key/public key may be stored on both the tag device 602 and the owner device 604. The private key/public key may be used as a part of coded tag information. The coded tag information may be coded information transmitted by a tag device to help identify the tag device. The coded tag information may include a hash of or otherwise encrypted version of the public key, or a permanent identifier of the tag device. However, an unencrypted public key would not be tag information or coded tag information. In some cases, hash information for the public key may also be generated and stored on the tag device 602 and the owner device 604. In some cases, the hash information may be a set of hashes of the public key along with other parameters. These other parameters may help generate a set of different hashes. In some cases, the hash information may be the public key and information about what other parameters may be hashed along with the public key, and timing information. For example, it may be more space efficient to store the public key, other parameters, and an indication of which parameter of the other parameters may be used, and when to use that parameter, to calculate a hash value with the public key as compared to storing a set of predetermined hashes (e.g., predetermined tag identifiers). In some cases, how long a tag identifier (e.g., hash) may be used may be user configurable. For example, during the onboarding procedure 610, the owner may configure one or more time slots, the time slots defining when and how long a single tag identifier may be used if the tag device 602 is lost/misplaced (e.g., between 6 PM and 7 PM). In some cases, the private key may be stored on the owner device 604.

In some examples, the owner device 604 may register 612 with the location tracking service 606. In some cases, during registration, the owner device 604 may send the public key, tag identifiers, and time slots to the location tracking service 606. In some cases, the public key, tag identifiers, and time slots may also be updated after the initial registration.

In some cases, the tag device 602 may determine that it has been lost/misplaced and may transmit a lost tag message based on this determination. In some cases, the tag device 602 may determine that it has been separated from the owner device 604 based on an owner beacon. In some cases, a tag device 602 may be considered separated from the owner device if the tag is not physically near, such as within range of a transmission from, the owner device 604. In some cases, the owner device 604 (or another device associated with the owner's account) may periodically transmit an owner beacon. In some cases, the tag device 602 may store timing information indicating when the tag device 602 last received the owner beacon. In some cases, if the tag device 602 does not receive the owner beacon within a threshold amount of time, the tag device 602 may determine that it has been lost/misplaced and begin to broadcast a lost tag signal 614. In some cases, the threshold amount of time may be a number hours to a day or anywhere in between.

In some cases, a tag device 602 may determine that it has been separated from the user device 604 based on an estimated location. For example, the tag device 602 may be configured to determine the tag device 602 is separated if the tag device 602 is removed from certain defined geographic areas (e.g., geographic boundary).

In some cases, detection that a tag device is separate from a user device may be performed by a server, such as location tracking service 606. Server side separation detection may be performed in place of, or in addition to a tag device determining that the tag device has been separated from the user device. In some cases, a server, such as one for the location tracking service 606, may detect whether a tag device 602 is separated based on a reported time/location of the tag device 602 and additional information. For example, a virtual fence or area of interest may be provided as the additional information and the server may determine whether the tag device 602 is separated by comparing reported location of the tag device and the virtual fence/area of interest. If the tag device 602 is outside of the virtual fence/area of interest, then the server may determine that the tag device 602 has been separated. As another example, in some cases, the tag device 602 may report location information to the server and the server may monitors a time associated with the reported location information. If location information has not been received for a threshold amount of time, then the server may determine that the tag device 602 has been separated. In some cases, the tag device 602 and the owner device 604 may report location information to the server. If the location between the tag device 602 and the owner device 604 exceeds a threshold distance, then the server may determine that the tag device 602 has been separated. Additionally, if the tag device 602 indicates that the tag device 602 has not received the owners beacon for more than a threshold amount of time, the server may determine that the tag device 602 has been separated.

In some cases, the tag device 602 may be a passive or semi-passive energy harvesting (EH) device which itself is not capable of directly generating a transmission. Rather, the (semi) passive EH device (e.g., tag device 602) may be energized using energy from RF transmissions. In some cases, an energizing and/or triggering transmission may be a lost tag energizing signal. In some cases, this lost tag energizing signal may be transmitted by the relay device 608. In some cases, the owner beacon may also energize the (semi) passive EH device. The (semi) passive EH device may be energized by the lost tag energizing signal and the (semi) passive EH device may use this energy to determine whether the (semi) passive EH device has been lost/misplaced, as well as for receiving and transmitting messages. In some cases, (semi) passive EH device may determine the tag identifier based on the hash information and public key using the harvested energy. In other cases, such as if the (semi) passive EH device cannot extract enough energy to perform the hashing, the tag identifiers may be predetermined and stored on the (semi) passive EH device for transmission. In some cases, the relay device 608 may be a wireless device, such as a UE. In other cases, the relay device 608 may be a network device such as a base station, gNB, eNB, etc.

If the tag device 602 determines that it has been lost/misplaced, the tag device may begin to broadcast a lost tag signal 614. In some cases, the lost tag signal 614 may include a tag identifier of the tag device 602. As discussed above, the tag identifier may be a hash value determined based on the public key along with a parameter of a set of other parameters. In some cases, the tag identifier may change based on a time slot. For example, the hash value of the tag identifier may be determined based on the public key and different parameters of the set of other parameters based on the time slot and current time. The tag device 602 may periodically broadcast the lost tag signal 614.

In some cases, the lost tag signal 614 may be broadcast using any wireless protocol, such as BLE, Wi-Fi, cellular protocols, such as 4G, LTE, 5G, and the like. In some cases, the tag identifier may be used to avoid limitations imposed based on packet sizes of some protocols, such as BLE. For example, BLE packet sizes may make it difficult to directly transmit a public key longer than 224 bits. In some cases, using the hash of a public key as tag identifier can address such limitation of public key size. Hashing the public key using certain hashing algorithms, such as secure hash algorithm (SHA) such as SHA-2 or SHA-3, allows a substantially longer string, such as a 256-bit or a 512-bit public key, such as an Elliptic-curve cryptography (ECC) public key, plus parameter(s) to be hashed to a specific length, such as 224 bits. Security of the public key/private key pair can thus be increased by allowing longer public keys/private keys to be used.

The relay device 608 may receive the lost tag signal 614 from the tag device 602. In some cases, the relay device may then contact the location tracking service 606 and send a first message 616 including the tag identifier received from the tag device 602 to the location tracking service 606. The location tracker service 606 may then lookup the tag identifier received from the tag device 602 against tag identifiers received from the owner device 604 (e.g., during a registration process for the tag device, such as a process during which an owner registers the tag identifier and corresponding public key to the location tracker service 606). After matching the tag identifier, the location tracking service 606 may send a response 618 to the first message 616. In some cases, the response 618 may include the public key of the tag device 602 and possibly the tag identifier. By performing a lookup of the public key by the location tracking service 606 rather than the tag device 602 broadcasting the public key, spamming and/or spoofing attacks where a relay device 608 is bombarded by lost tag broadcasts, or a lost tag broadcast is copied and replayed at many locations to create false location information may be avoided/limited using server side controls by the location tracking service 606.

Based on the response 618, the relay device 608 may obtain location information about a location of the relay device 608. In some cases, the location information may be provided through GNSS satellite based systems 622, such as GPS, GLONASS, GNSS, BDS, and the like. In some cases, the location information may be based, at least in part, on positioning technologies, such as received signal angle, triangulated positions, ranging, and the like. In some cases, the location information may be based on a location of a wireless node, a zone identifier associated with a wireless network, and the like. For example, the relay device 608 may transmit location information based on a wireless node that the relay device 608 is connected to. In some cases, additional environmental information may also be provided, such as Wi-Fi identifiers (e.g., BSSIDs of nearby WiFi access points), information associated with a vehicle mounted relay, such as a bus number, train number, and the like), or other similar environmental information that may be used to locate the tag device. In some cases, additional information that helps locate the tag device 602 may be included by the relay device 608. In some cases, the relay device 608 may encrypt the obtained location information using the public key received in the response 618 in a second message 620 sent to the location tracking service 606. As the location information may be encrypted using the public key of the tag device 602, the location tracking service 606 may not be able to decrypt the location information.

In some cases, the location tracking service 606 may send 624 the encrypted location information to the owner device 604. For example, the owner device 604 may have push notifications set up with the location tracking service 606 and the location tracking service 606 may push a notification with the location information to the owner device 604. As another example, the owner device 604 may request (e.g., pull) the location information from the location tracking service 606. The owner device 604 may then use the private key associated with the public key that was used to encrypt the location information, to decrypt the location information to help find the tag device.

In some cases, a payment/reward model may be established. For example, the owner device 604 may provide a payment to access location information for the tag device to the location tracking service 606. As the location tracking service 606 may send response 618 to the relay device 608 to obtain the location information, the location tracking service 606 may be able to identify the relay device 608. A reward may be provided to the relay device 608 based on this identification. In some cases, relay devices 608 may first register with the location tracking service 606 to receive the reward. In some cases, relay devices 608 which do not register with the location tracking service 606 may not be identified and/or rewarded.

In some cases, there may be multiple location tracking services 606 associated with, and operated by, different location tracking services. In some cases, the tag device 602 may broadcast a routing identifier, such as a URL for the tracking service, as a part of the lost tag signal 614 along with the tag identifier. The relay device 708 may then forward the tag identifier to the URL or use the URL to obtain the public key associated with the tag identifier. In some cases, there may be a desire to limit access to the routing identifiers to avoid eavesdropping by devices which may not help locate the tag device. In such cases, the routing identifier may be encrypted, for example, using the public key of a routing service.

Figure 7:
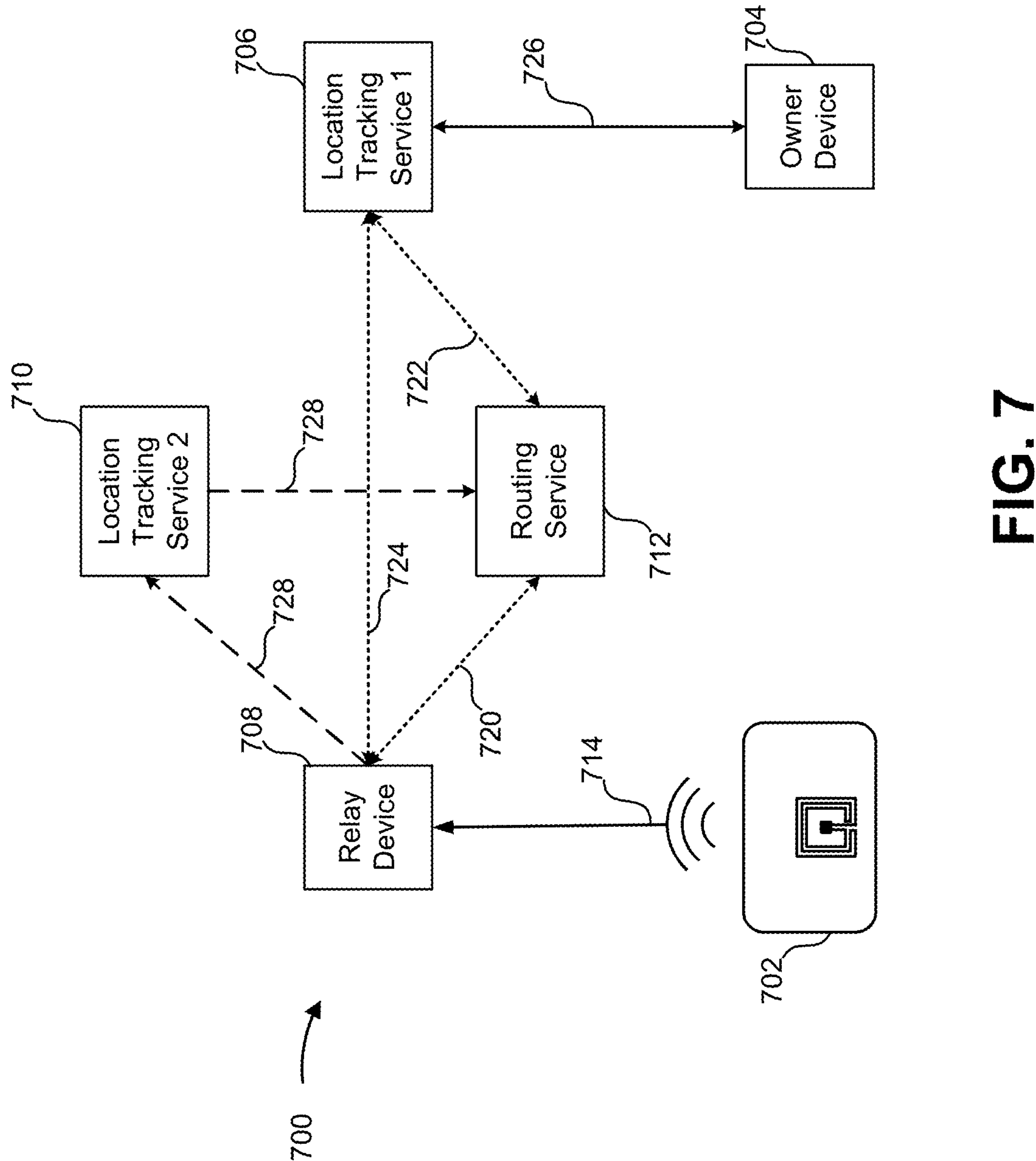
FIG. 7 is a diagram illustrating an example of an environment for routing using a routing identifier, in accordance with aspects of the present disclosure.

FIG. 7 is a diagram illustrating an example of an environment 700 for routing using a routing identifier, in accordance with aspects of the present disclosure. As shown, the environment 700 may include a tag device 702, an owner device 704, a first location tracking service 706, a second location tracking service 710, a relay device 708, and a routing service 712. While environment 700 includes two location tracking services, it should be understood that any number of location tracking services may be available. Environment 700 helps provide a common routing infrastructure for tag devices while allowing for multiple location tracking services. In FIG. 7, the tag device 702 may broadcast a routing identifier as a part of a lost tag signal 714 along with the tag identifier. The routing identifier may identify a location tracking service, such as the first location tracking service 706, that the tag device 702 and the owner device 704 are associated with. In some cases, the routing identifier may be encrypted using a public key of a routing service 712.

In some cases, the relay device 708 may receive the lost tag signal 714 from the tag device. As the relay device 708 may not be able to decrypt the encrypted routing identifier from the lost tag signal 714, the relay device 708 may send 720 the encrypted routing identifier and tag identifier to the routing service 712. In some cases, the relay device 708 may also transmit location information for the relay device 708 to the routing service 712. The routing service 712 may decrypt the routing identifier to identify the appropriate location tracking service. The routing service may then send 722 the tag identifier to the appropriate location tracking service, here the first location tracking service 706. If location information is received from the relay device 708, the location information may also be sent 722 to the location tracking service. If location information is not received from the relay device 708, the location tracking service, such as the first location tracking service 706, may transmit the public key and possibly the tag identifier to the relay device 708, either directly 724 or via the routing service 712. The relay device 708 may then encrypt the location information using the public key and transmit the encoded location information to the location tracking service, such as the first location tracking service 706, either directly 724 or via the routing service 712. In some cases, the relay device 708 may be registered with, or configured to use, the routing service 712. The owner device 704 may access 726 the first location tracking service 706 to obtain location information for the tag device 702 in a manner similar to that described above with respect to FIG. 6.

In some cases, the relay device 708 may not be configured to use, or does not have a relationship with, the routing service 712, but can access another location tracking service, such as the second location tracking service 710. In such cases, the relay device 708 may send 728 the encrypted routing identifier, tag identifier to the routing service, and location information to the location tracking service the relay device 708 is associated with (e.g., the second location tracking service 710). In some cases, the location information may be encrypted, for example, using a public key of the associated location tracking service, here the second location tracking service 710. The second location tracking service 710 may then forward the encrypted routing identifier, tag identifier to the routing service, and location information to the routing service 712. The routing service may then identify the appropriate location tracking service, here the first location tracking service 706, and send 722 the tag identifier and location information to the appropriate location tracking service, here the first location tracking service 706. In some cases, the location tracking services may each individually act as routing services 712 and may forward messages from relay devices to other location tracking services.

In some cases, the tag device, such as tag device 602 of FIG. 6 or tag device 702 of FIG. 7, may be able to determine location information. For example, the tag device may be able to determine location information based on information from nearby wireless nodes, such as a from a BS, AP, eNB, gNB, and the like using nearby cell IDs, BSSIDs, 3GPP location services, or use ranging and/or positioning technologies, such as received signal angle, triangulated positions, and the like. In some cases, the tag device may also be able to access and determine location information using GNSS systems. In cases where the tag device is able to determine location information, the tag device may encrypt the location information using the public key of the tag device. The tag device may then broadcast the encrypted location information along with the tag identifier (and possibly the routing identifier) in a manner substantially similar to that described above with respect to FIG. 6 and FIG. 7. In some cases, the relay device receiving the broadcast from the tag device may not be able to determine if location information is included. The relay device may thus pass along location information of the relay device, as described above with respect to FIG. 6 and FIG. 7. In some cases, the tag device may provide a digital signature along with the to the location information and the tag identifier. In some cases, the relay device may verify the digital certificate and pass the tag identifier and location information from the tag device, along with the location information for the relay device to the location tracking service or routing service, as described above with respect to FIG. 6 and FIG. 7. The user device may then access the location information provided by the tag device and the location information provided by the relay device. This additional location information my potentially increase location accuracy and/or confidence in the reported location, as well as potentially help filter out potentially fraudulent location reports.

In some cases, tag device privacy with respect to the location tracking service may not be priority. For example, in some cases, the tag device may be owned by the location tracking service. In such cases, the tag device may encrypt the permanent identifier of the tag device with the public key of the location tracking service. The tag device may transmit this encrypted permanent identifier in the lost tag signal. If the tag device is configured to transmit routing information with the lost tag signal, then the tag device may transmit routing information for the location tracking service in the lost tag signal. The tag device may further encrypt the routing information with the public key of the routing service. If the tag device can determine location information, the tag device may encrypt the determined location information with the public key of the location tracking service. The relay device, after receiving the lost tag signal, may send the encrypted permanent identifier (and encrypted location information, if available) to the location tracking service (using the routing information, if available), in a manner similar to that described above with respect to FIG. 6 and FIG. 7. The relay device may also send its location information. In some cases, the relay device's location information may be sent to the location tracking service unencrypted, or encrypted using the public key of the location tracking service. The relay device may obtain the public key of the location tracking service, for example, by sending the encrypted permanent identifier to the location tracking service and receiving the public key of the location tracking service in a manner similar to that described in FIG. 6, or the public key of the location tracking service may be included in the lost tag signal.

In some cases, the tag device may verify one or more nearby relay devices. In cases where the tag device may verify a relay device, the tag device may have a certificate authority (CA) certificate. In some cases, the CA certificate may be provisioned on the tag device during a setup procedure, for example during manufacturing, or during an onboarding procedure, such as onboarding procedure 610 of FIG. 6. The tag device may establish a secure wireless channel, such as by using BLE, sidelink, Wi-Fi, to the relay device. The relay device may then provide its certificate from the CA. The tag device may then establish a wireless connection to a wireless network to verify the certificate. The relay device may then sign further messages to the tag device using the private key associated with the relay device's certificate. In some cases, the tag device may verify relay devices when the tag device is to report its identifier or location information upon request, such as in response to paging, a certain beacon, and the like. In some cases, the tag device may verify relay devices when the tag device is an active tag device with its own power source.

In some cases, a master key-generating key $SK_M$ may be used to generate ephemeral (time-limited) secret key (e.g., private key) SK/PK (public key) pairs. In some cases, the SK/PK pair may be generated by an owner of the tag device (e.g., based on user input provided by the owner). For example, the owner may be a user (e.g., or an account associated with the user) of the tag device and user device. In another example, the owner may be the location tracking service (e.g., in cases where the tag device is owned by the location tracking service and rented, loaned, entrusted, and the like to users). The $SK_M$ may be shared between the tag device and the user device (or between the tag device and location tracking service in cases where the tag device is owned by the location tracking service). A key derivation function (KDF), constructed using a cryptographic hash function such as SHA-2/SHA-3, may be applied. The $SK_M$ and a parameter may be input to the KDF to derive a secret key $SK_i$ for that parameter, such as a time slot, as shown: $SK_i$=KDF ($SK_M$, param) where param is an index, time index, or other parameter. A public key $PK_i$ for that parameter may then be derived from $SK_i$ as $PK_i=SK_i*G$ where G is a generator (public parameter). The generator G may also be shared between the tag device and the user device. The tag identifier $ID_{PKi}$ may then be generated as $ID_{PKi}$=Hash ($PK_i$).

In some cases, the master key generating key SK may be reset, for example, if the tag device is transferred to a new owner. In some cases, the master key generating key $SK_M$ may be provisioned at the tag device by its owner during initialization. When the master key generating key $SK_M$ is provisioned by the owner, the master key generating key $SK_M$ may be encrypted using the tag device permanent key (e.g., device public key (PK) generated from the device master key or a device secret key (SK)) so that only the tag device can decrypt the key generating key. The master key generating key $SK_M$ may be derived at the tag device and the owner (e.g., user device or location tracking service) based on a key agreement protocol, such as Elliptic Curve Diffie-Hellman (ECDH).

In some cases, a new master key $SK_O$ may be generated when the owner changes, such as during a factory reset, or initialization process. In other cases, a manufacturing master key SK may be provisioned at manufacturing time and used to generate the $SK_O$ upon ownership change. In some cases, $SK_O$=KDF (SK, param) where param is a random number or a Elliptic Curve Diffie-Hellman (ECDH) secret established during the initialization. In some cases, $PK_O$ may be generated based on $PK_O=SK_O*G$. $PK_O$ and $SK_O$ may be used as long-term keys (e.g., per owner) for generating ephemeral SK/PK pairs.

In some cases, other keys that may be shared between the tag device and user device may include attestation key, provisioning key, and device keys. In some cases, the attestation key may be public/private key pair used by the tag device for remote attestation (if needed). In some cases, the provisioning key may be a public key (or certificate) of the owner (e.g., owner account or user device) or provisioning server used for provisioning. The provisioning key may be used by the tag device to verify the provisioning information received from the owner or provisioning server. In some cases, the device key may be a public/private key pair provisioned to the tag device during the manufacturing. The device key may be used by the owner or provisioning server to encrypt the provisioning information for tag device.

Figure 8:
FIG. 8 is a flow diagram illustrating an example of a process for wireless communications, in accordance with some examples.
Figure 8:
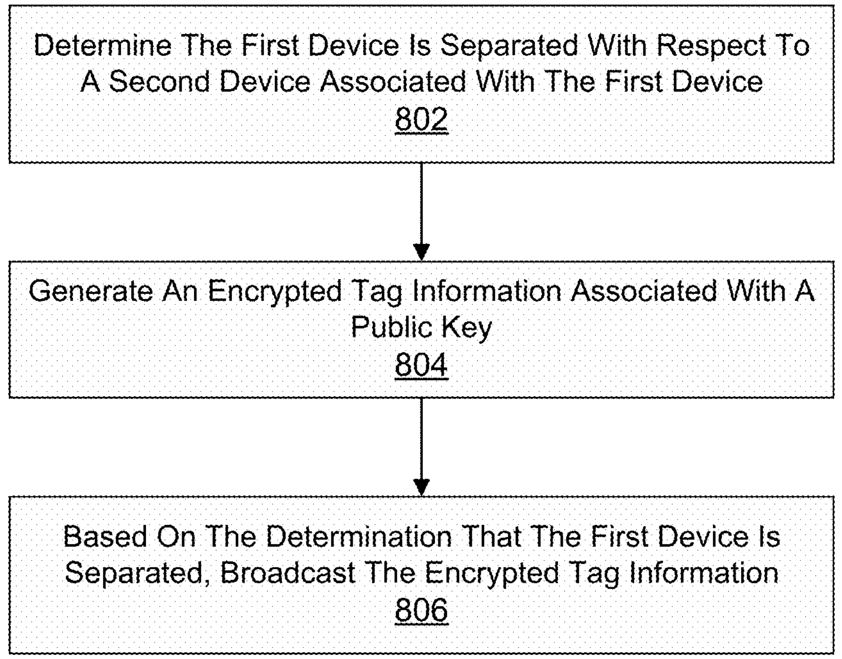

FIG. 8 is a flow diagram illustrating an example of a process 800 for wireless communications. The process 800 may be performed by a first wireless device (e.g., computing device) or by a component or system (e.g., a chipset) of the first wireless device. The first wireless device may be an energy harvesting device 500 of FIG. 5, a wireless device, such as computing system 1000, or a UE (e.g., a mobile device such as a mobile phone, a network-connected wearable such as a watch, an extended reality device such as a virtual reality (VR) device or augmented reality (AR) device, a vehicle or component or system of a vehicle, or other type of UE) or other type of network node. In some examples, the process 800 may be performed by a UE and/or an energy harvesting device. In some cases, the UE can be an energy harvesting device. The operations of the process 800 may be implemented as software components that are executed and run on one or more processors (e.g., processor 1010 of FIG. 10 or other processor(s)). Further, the transmission and reception of signals by the network device in the process 800 may be enabled, for example, by one or more antennas, one or more transceivers (e.g., wireless transceiver(s)), and/or other communication components (e.g., the transmit processor 220, the receive processor 238, the TX MIMO processor 230, the MIMO detector 236, the modulator(s)/demodulator(s) 232*a* through 232*t*, and/or the antenna(es) 234*a* through 234*t* of FIG. 2, the communications interface 1040 of FIG. 10, or other antennae(s), transceiver(s), and/or component(s)).

At block 802 the computing device (or component thereof) may determine the first device is separated with respect to a second device associated with the first device. In some examples, the computing device (or component thereof) may determine the first device is separated by determining that a beacon of the second device has not been received within a threshold amount of time.

At block 804 the computing device (or component thereof) may generate tag information associated with a public key. In some cases, the tag information comprises an encrypted permanent identifier of the first device. In some examples, the computing device (or component thereof) may obtain the public key, wherein the public key is a public key of a tracking service. In some examples, the computing device (or component thereof) may encrypt the permanent identifier based on the public key of the tracking service. In some cases, the computing device (or component thereof) may obtain the public key, and wherein the tag information comprises a tag identifier. In some examples, the tag identifier includes a hash of the public key. In some cases, the tag identifier has a first length that is shorter than a second length of the public key. In some examples, the tag information is based on the public key and a parameter. In some examples, the computing device (or component thereof) may select the parameter based on a current time. In some cases, the public key and the parameter are obtained from the second device. In some examples, the computing device (or component thereof) may receive a signal from a wireless network. In some cases, the computing device (or component thereof) may determine location information from the signal. In some examples, the computing device (or component thereof) may encrypt the location information based on the public key. In some cases, the computing device (or component thereof) may broadcast the encrypted location information with the tag information. In some examples, the tag information comprises coded tag information.

At block 806 the computing device (or component thereof) may, based on the determination that the first device is separated, broadcast the tag information. In some cases, the computing device (or component thereof) may broadcast the tag information by broadcasting a routing identifier with the tag information. In some examples, the routing identifier is encrypted based on a public key of a routing service.

In some examples, the processes described herein (e.g., process 800, and/or other process described herein) may be performed by a computing device or apparatus (e.g., a network node such as a UE, base station, a portion of a base station, etc.). For example, as noted above, one or more of the processes described herein (e.g., the process 1100, and/or other process described herein) may be performed by a UE and/or an energy harvesting device (e.g., an EH-capable device).

Figure 9:
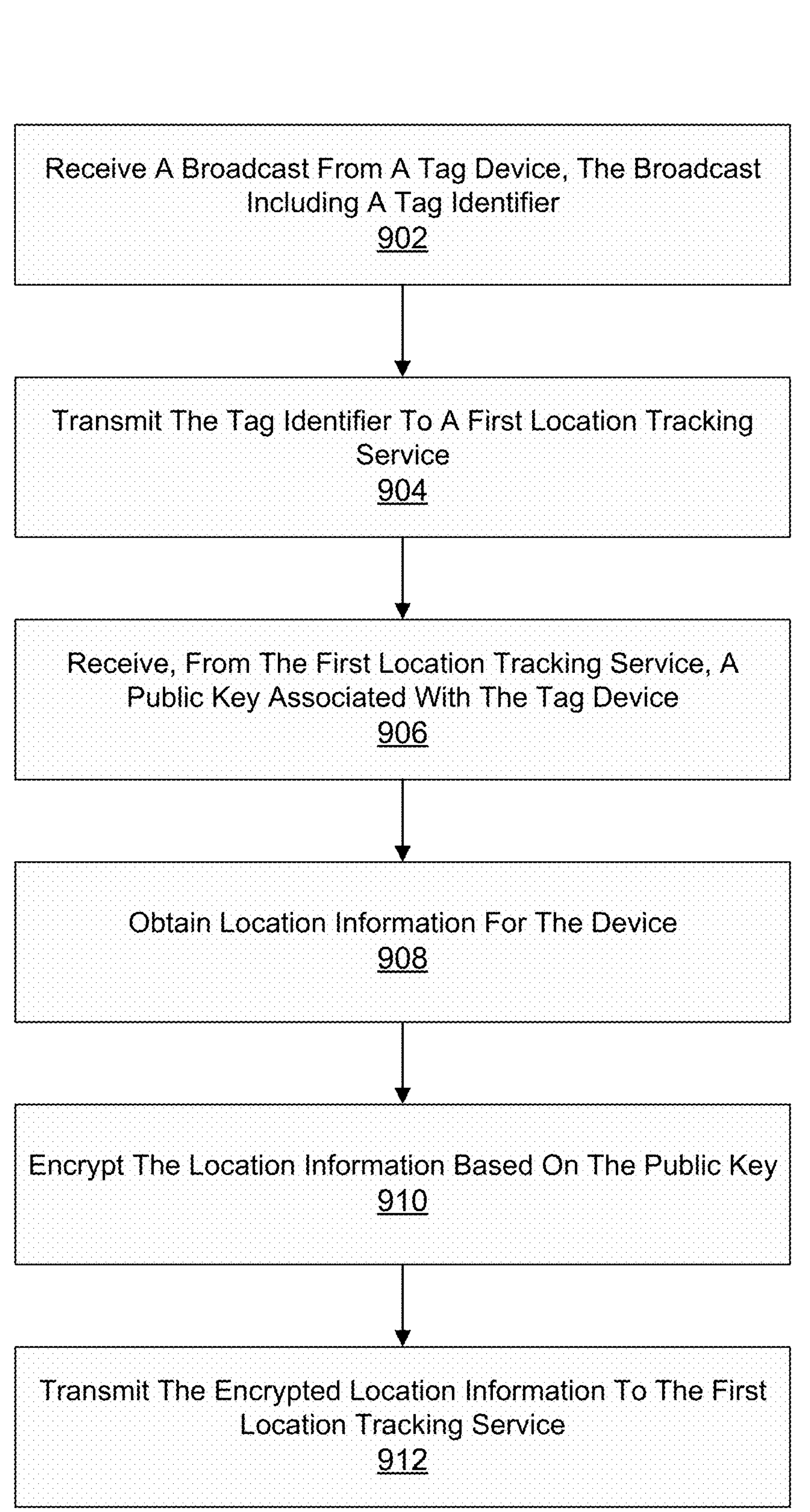
FIG. 9 is a flow diagram illustrating another example of a process for wireless communications, in accordance with some examples.

FIG. 9 is a flow diagram illustrating an example of a process 900 for wireless communications. The process 900 may be performed by a wireless device (e.g., computing device) or by a component or system (e.g., a chipset) of the wireless device. The wireless device may be a relay device (e.g., relay device 608 of FIG. 6, relay device 708 of FIG. 7), a wireless device, such as computing system 1000, or a UE (e.g., UE 104 of FIG. 1, wireless device 407 of FIG. 4, a mobile device such as a mobile phone, a network-connected wearable such as a watch, an extended reality device such as a virtual reality (VR) device or augmented reality (AR) device, a vehicle or component or system of a vehicle, or other type of UE) or other type of network node. The operations of the process 900 may be implemented as software components that are executed and run on one or more processors (e.g., processor 1010 of FIG. 10 or other processor(s)). Further, the transmission and reception of signals by the network device in the process 900 may be enabled, for example, by one or more antennas, one or more transceivers (e.g., wireless transceiver(s)), and/or other communication components (e.g., the transmit processor 220, the receive processor 238, the TX MIMO processor 230, the MIMO detector 236, the modulator(s)/demodulator(s) 232*a* through 232*t*, and/or the antenna(es) 234*a* through 234*t* of FIG. 2, the communications interface 1040 of FIG. 10, or other antennae(s), transceiver(s), and/or component(s)).

At block 902, the computing device (or component thereof) may receive a broadcast from a tag device, wherein the broadcast comprises a tag identifier. In some cases, the computing device (or component thereof) may receive the public key from the routing service, wherein the public key was obtained by the routing service from the first location tracking service. In some examples, the broadcast further comprises a routing identifier. In some cases, the computing device (or component thereof) may transmit the routing identifier to a routing service. In some examples, the routing identifier identifies a second location tracking service. In some cases, the computing device (or component thereof) may transmit the tag identifier and routing identifier to the first location tracking service to forward to the second location tracking service. In some cases, the routing identifier is encrypted. In some examples, the tag identifier has a first length that is shorter than a second length of the public key.

At block 904, the computing device (or component thereof) may transmit the tag identifier to a first location tracking service. In some cases, the computing device (or component thereof) may transmit the tag identifier to the first location tracking service by transmitting the tag identifier to a routing service to forward the tag identifier to the first location tracking service.

At block 906, the computing device (or component thereof) may receive, from the first location tracking service, a public key associated with the tag device.

At block 908, the computing device (or component thereof) may obtain location information for the device.

At block 910, the computing device (or component thereof) may encrypt the location information based on the public key.

At block 912, the computing device (or component thereof) may transmit the encrypted location information to the first location tracking service.

In some cases, the computing device or apparatus may include various components, such as one or more input devices, one or more output devices, one or more processors, one or more microprocessors, one or more microcomputers, one or more cameras, one or more sensors, and/or other component(s) that are configured to carry out the steps of processes described herein. In some examples, the computing device may include a display, one or more network interfaces configured to communicate and/or receive the data, any combination thereof, and/or other component(s). The one or more network interfaces may be configured to communicate and/or receive wired and/or wireless data, including data according to the 3G, 4G, 5G, and/or other cellular standard, data according to the WiFi (802.11x) standards, data according to the Bluetooth™ standard, data according to the Internet Protocol (IP) standard, and/or other types of data.

The components of the computing device may be implemented in circuitry. For example, the components may include and/or may be implemented using electronic circuits or other electronic hardware, which may include one or more programmable electronic circuits (e.g., microprocessors, graphics processing units (GPUs), digital signal processors (DSPs), central processing units (CPUs), and/or other suitable electronic circuits), and/or may include and/or be implemented using computer software, firmware, or any combination thereof, to perform the various operations described herein.

The process 800 and the process 900 are illustrated as a logical flow diagram, the operation of which represent a sequence of operations that may be implemented in hardware, computer instructions, or a combination thereof. In the context of computer instructions, the operations represent computer-executable instructions stored on one or more computer-readable storage media that, when executed by one or more processors, perform the recited operations. Generally, computer-executable instructions include routines, programs, objects, components, data structures, and the like that perform particular functions or implement particular data types. The order in which the operations are described is not intended to be construed as a limitation, and any number of the described operations may be combined in any order and/or in parallel to implement the processes.

Additionally, process 800 and the process 900, and/or other process described herein may be performed under the control of one or more computer systems configured with executable instructions and may be implemented as code (e.g., executable instructions, one or more computer programs, or one or more applications) executing collectively on one or more processors, by hardware, or combinations thereof. As noted above, the code may be stored on a computer-readable or machine-readable storage medium, for example, in the form of a computer program comprising a plurality of instructions executable by one or more processors. The computer-readable or machine-readable storage medium may be non-transitory.

Figure 10:
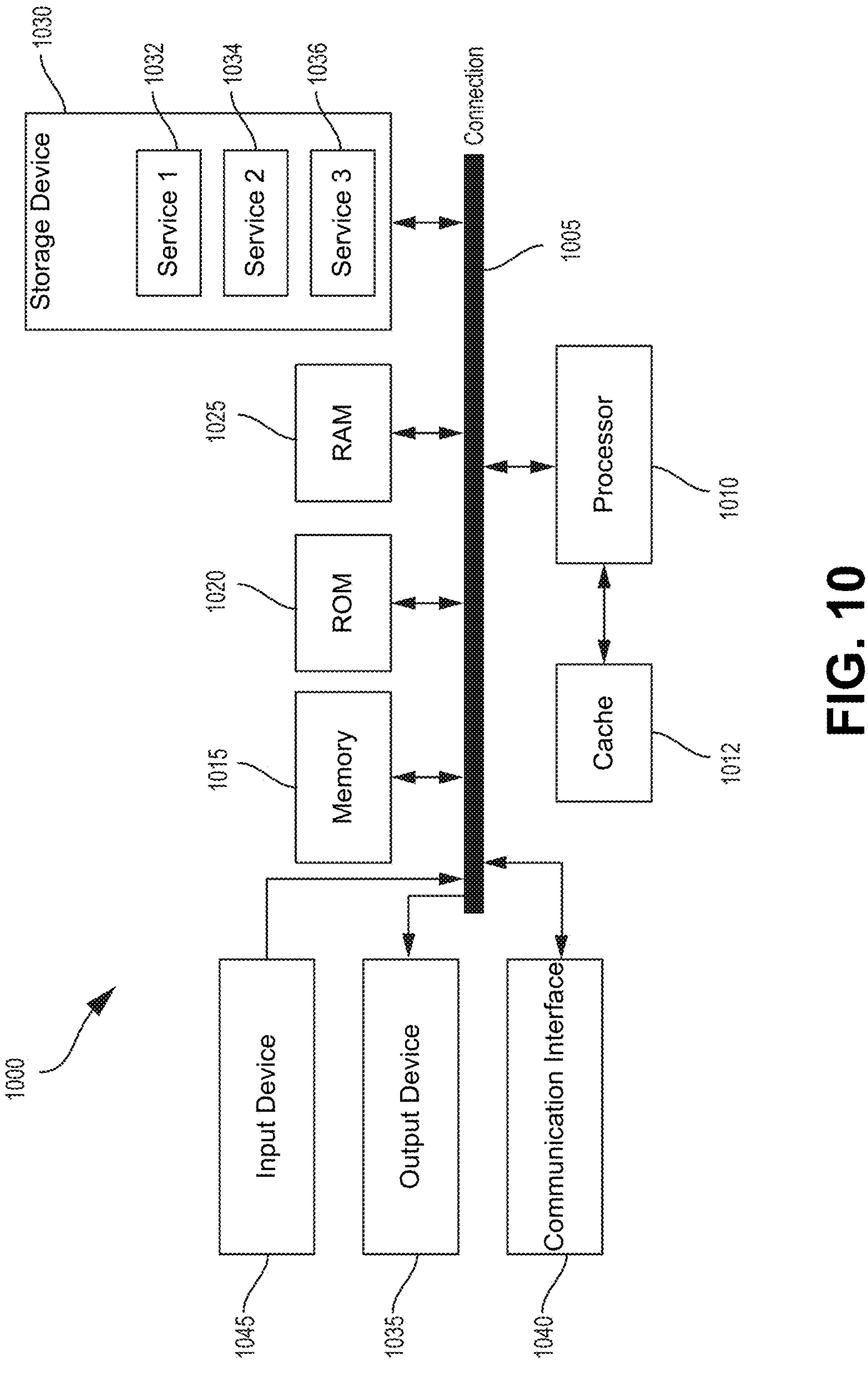
FIG. 10 is a block diagram illustrating an example of a computing system, in accordance with some examples.

FIG. 10 is a diagram illustrating an example of a system for implementing certain aspects of the present technology. In particular, FIG. 10 illustrates an example of computing system 1000, which may be for example any computing device making up internal computing system, a remote computing system, a camera, or any component thereof in which the components of the system are in communication with each other using connection 1005. Connection 1005 may be a physical connection using a bus, or a direct connection into processor 1010, such as in a chipset architecture. Connection 1005 may also be a virtual connection, networked connection, or logical connection.

In some aspects, computing system 1000 is a distributed system in which the functions described in this disclosure may be distributed within a datacenter, multiple data centers, a peer network, etc. In some aspects, one or more of the described system components represents many such components each performing some or all of the function for which the component is described. In some aspects, the components may be physical or virtual devices.

Example system 1000 includes at least one processing unit (CPU or processor) 1010 and connection 1005 that communicatively couples various system components including system memory 1025, such as read-only memory (ROM) 1020 and random access memory (RAM) 1025 to processor 1010. Computing system 1000 may include a cache 1015 of high-speed memory connected directly with, in close proximity to, or integrated as part of processor 1010.

Processor 1010 may include any general-purpose processor and a hardware service or software service, such as services 1032, 1034, and 1036 stored in storage device 1030, configured to control processor 1010 as well as a special-purpose processor where software instructions are incorporated into the actual processor design. Processor 1010 may essentially be a completely self-contained computing system, containing multiple cores or processors, a bus, memory controller, cache, etc. A multi-core processor may be symmetric or asymmetric.

To enable user interaction, computing system 1000 includes an input device 1045, which may represent any number of input mechanisms, such as a microphone for speech, a touch-sensitive screen for gesture or graphical input, keyboard, mouse, motion input, speech, etc. Computing system 1000 may also include output device 1035, which may be one or more of a number of output mechanisms. In some instances, multimodal systems may enable a user to provide multiple types of input/output to communicate with computing system 1000.

Computing system 1000 may include communications interface 1040, which may generally govern and manage the user input and system output. The communications interface may perform or facilitate receipt and/or transmission wired or wireless communications using wired and/or wireless transceivers, including those making use of an audio jack/plug, a microphone jack/plug, a universal serial bus (USB) port/plug, an Apple™ Lightning™ port/plug, an Ethernet port/plug, a fiber optic port/plug, a proprietary wired port/plug. 3G, 4G, 5G and/or other cellular data network wireless signal transfer, a Bluetooth™ wireless signal transfer, a Bluetooth™ low energy (BLE) wireless signal transfer, an IBEACON™ wireless signal transfer, a radio-frequency identification (RFID) wireless signal transfer, near-field communications (NFC) wireless signal transfer, dedicated short range communication (DSRC) wireless signal transfer, 802.11 Wi-Fi wireless signal transfer, wireless local area network (WLAN) signal transfer, Visible Light Communication (VLC), Worldwide Interoperability for Microwave Access (WiMAX), Infrared (IR) communication wireless signal transfer, Public Switched Telephone Network (PSTN) signal transfer, Integrated Services Digital Network (ISDN) signal transfer, ad-hoc network signal transfer, radio wave signal transfer, microwave signal transfer, infrared signal transfer, visible light signal transfer, ultraviolet light signal transfer, wireless signal transfer along the electromagnetic spectrum, or some combination thereof. The communications interface 1040 may also include one or more Global Navigation Satellite System (GNSS) receivers or transceivers that are used to determine a location of the computing system 1000 based on receipt of one or more signals from one or more satellites associated with one or more GNSS systems. GNSS systems include, but are not limited to, the US-based Global Positioning System (GPS), the Russia-based Global Navigation Satellite System (GLONASS), the China-based BeiDou Navigation Satellite System (BDS), and the Europe-based Galileo GNSS. There is no restriction on operating on any particular hardware arrangement, and therefore the basic features here may easily be substituted for improved hardware or firmware arrangements as they are developed.

Storage device 1030 may be a non-volatile and/or non-transitory and/or computer-readable memory device and may be a hard disk or other types of computer readable media which may store data that are accessible by a computer, such as magnetic cassettes, flash memory cards, solid state memory devices, digital versatile disks, cartridges, a floppy disk, a flexible disk, a hard disk, magnetic tape, a magnetic strip/stripe, any other magnetic storage medium, flash memory, memristor memory, any other solid-state memory, a compact disc read only memory (CD-ROM) optical disc, a rewritable compact disc (CD) optical disc, digital video disk (DVD) optical disc, a blu-ray disc (BDD) optical disc, a holographic optical disk, another optical medium, a secure digital (SD) card, a micro secure digital (microSD) card, a Memory Stick® card, a smartcard chip, a EMV chip, a subscriber identity module (SIM) card, a mini/micro/nano/pico SIM card, another integrated circuit (IC) chip/card, random access memory (RAM), static RAM (SRAM), dynamic RAM (DRAM), read-only memory (ROM), programmable read-only memory (PROM), erasable programmable read-only memory (EPROM), electrically erasable programmable read-only memory (EEPROM), flash EPROM (FLASHEPROM), cache memory (e.g., Level 1 (L1) cache, Level 2 (L2) cache, Level 3 (L3) cache, Level 4 (L4) cache, Level 5 (L5) cache, or other (L #) cache), resistive random-access memory (RRAM/ReRAM), phase change memory (PCM), spin transfer torque RAM (STT-RAM), another memory chip or cartridge, and/or a combination thereof.

The storage device 1030 may include software services, servers, services, etc., that when the code that defines such software is executed by the processor 1010, it causes the system to perform a function. In some aspects, a hardware service that performs a particular function may include the software component stored in a computer-readable medium in connection with the necessary hardware components, such as processor 1010, connection 1005, output device 1035, etc., to carry out the function. The term "computer-readable medium" includes, but is not limited to, portable or non-portable storage devices, optical storage devices, and various other mediums capable of storing, containing, or carrying instruction(s) and/or data. A computer-readable medium may include a non-transitory medium in which data may be stored and that does not include carrier waves and/or transitory electronic signals propagating wirelessly or over wired connections. Examples of a non-transitory medium may include, but are not limited to, a magnetic disk or tape, optical storage media such as compact disk (CD) or digital versatile disk (DVD), flash memory, memory or memory devices. A computer-readable medium may have stored thereon code and/or machine-executable instructions that may represent a procedure, a function, a subprogram, a program, a routine, a subroutine, a module, a software package, a class, or any combination of instructions, data structures, or program statements. A code segment may be coupled to another code segment or a hardware circuit by passing and/or receiving information, data, arguments, parameters, or memory contents. Information, arguments, parameters, data, etc., may be passed, forwarded, or transmitted via any suitable means including memory sharing, message passing, token passing, network transmission, or the like.

Specific details are provided in the description above to provide a thorough understanding of the aspects and examples provided herein, but those skilled in the art will recognize that the application is not limited thereto. Thus, while illustrative aspects of the application have been described in detail herein, it is to be understood that the inventive concepts may be otherwise variously embodied and employed, and that the appended claims are intended to be construed to include such variations, except as limited by the prior art. Various features and aspects of the above-described application may be used individually or jointly. Further, aspects may be utilized in any number of environments and applications beyond those described herein without departing from the broader scope of the specification. The specification and drawings are, accordingly, to be regarded as illustrative rather than restrictive. For the purposes of illustration, methods were described in a particular order. It should be appreciated that in alternate aspects, the methods may be performed in a different order than that described.

For clarity of explanation, in some instances the present technology may be presented as including individual functional blocks comprising devices, device components, steps or routines in a method embodied in software, or combinations of hardware and software. Additional components may be used other than those shown in the figures and/or described herein. For example, circuits, systems, networks, processes, and other components may be shown as components in block diagram form in order not to obscure the aspects in unnecessary detail. In other instances, well-known circuits, processes, algorithms, structures, and techniques may be shown without unnecessary detail in order to avoid obscuring the aspects.

Further, those of skill in the art will appreciate that the various illustrative logical blocks, modules, circuits, and algorithm steps described in connection with the aspects disclosed herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present disclosure.

Individual aspects may be described above as a process or method which is depicted as a flowchart, a flow diagram, a data flow diagram, a structure diagram, or a block diagram. Although a flowchart may describe the operations as a sequential process, many of the operations may be performed in parallel or concurrently. In addition, the order of the operations may be re-arranged. A process is terminated when its operations are completed, but could have additional steps not included in a figure. A process may correspond to a method, a function, a procedure, a subroutine, a subprogram, etc. When a process corresponds to a function, its termination may correspond to a return of the function to the calling function or the main function.

Processes and methods according to the above-described examples may be implemented using computer-executable instructions that are stored or otherwise available from computer-readable media. Such instructions may include, for example, instructions and data which cause or otherwise configure a general purpose computer, special purpose computer, or a processing device to perform a certain function or group of functions. Portions of computer resources used may be accessible over a network. The computer executable instructions may be, for example, binaries, intermediate format instructions such as assembly language, firmware, source code. Examples of computer-readable media that may be used to store instructions, information used, and/or information created during methods according to described examples include magnetic or optical disks, flash memory, USB devices provided with non-volatile memory, networked storage devices, and so on.

In some aspects the computer-readable storage devices, mediums, and memories may include a cable or wireless signal containing a bitstream and the like. However, when mentioned, non-transitory computer-readable storage media expressly exclude media such as energy, carrier signals, electromagnetic waves, and signals per se.

Those of skill in the art will appreciate that information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof, in some cases depending in part on the particular application, in part on the desired design, in part on the corresponding technology, etc.

The various illustrative logical blocks, modules, and circuits described in connection with the aspects disclosed herein may be implemented or performed using hardware, software, firmware, middleware, microcode, hardware description languages, or any combination thereof, and may take any of a variety of form factors. When implemented in software, firmware, middleware, or microcode, the program code or code segments to perform the necessary tasks (e.g., a computer-program product) may be stored in a computer-readable or machine-readable medium. A processor(s) may perform the necessary tasks. Examples of form factors include laptops, smart phones, mobile phones, tablet devices or other small form factor personal computers, personal digital assistants, rackmount devices, standalone devices, and so on. Functionality described herein also may be embodied in peripherals or add-in cards. Such functionality may also be implemented on a circuit board among different chips or different processes executing in a single device, by way of further example.

The instructions, media for conveying such instructions, computing resources for executing them, and other structures for supporting such computing resources are example means for providing the functions described in the disclosure.

The techniques described herein may also be implemented in electronic hardware, computer software, firmware, or any combination thereof. Such techniques may be implemented in any of a variety of devices such as general purposes computers, wireless communication device handsets, or integrated circuit devices having multiple uses including application in wireless communication device handsets and other devices. Any features described as modules or components may be implemented together in an integrated logic device or separately as discrete but interoperable logic devices. If implemented in software, the techniques may be realized at least in part by a computer-readable data storage medium comprising program code including instructions that, when executed, performs one or more of the methods, algorithms, and/or operations described above. The computer-readable data storage medium may form part of a computer program product, which may include packaging materials. The computer-readable medium may comprise memory or data storage media, such as random access memory (RAM) such as synchronous dynamic random access memory (SDRAM), read-only memory (ROM), non-volatile random access memory (NVRAM), electrically erasable programmable read-only memory (EEPROM), FLASH memory, magnetic or optical data storage media, and the like. The techniques additionally, or alternatively, may be realized at least in part by a computer-readable communication medium that carries or communicates program code in the form of instructions or data structures and that may be accessed, read, and/or executed by a computer, such as propagated signals or waves.

The program code may be executed by a processor, which may include one or more processors, such as one or more digital signal processors (DSPs), general purpose microprocessors, an application specific integrated circuits (ASICs), field programmable logic arrays (FPGAs), or other equivalent integrated or discrete logic circuitry. Such a processor may be configured to perform any of the techniques described in this disclosure. A general-purpose processor may be a microprocessor; but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration. Accordingly, the term "processor," as used herein may refer to any of the foregoing structure, any combination of the foregoing structure, or any other structure or apparatus suitable for implementation of the techniques described herein.

One of ordinary skill will appreciate that the less than ("<") and greater than (">") symbols or terminology used herein may be replaced with less than or equal to ("≤") and greater than or equal to ("≥") symbols, respectively, without departing from the scope of this description.

Where components are described as being "configured to" perform certain operations, such configuration may be accomplished, for example, by designing electronic circuits or other hardware to perform the operation, by programming programmable electronic circuits (e.g., microprocessors, or other suitable electronic circuits) to perform the operation, or any combination thereof.

The phrase "coupled to" or "communicatively coupled to" refers to any component that is physically connected to another component either directly or indirectly, and/or any component that is in communication with another component (e.g., connected to the other component over a wired or wireless connection, and/or other suitable communications interface) either directly or indirectly.

Claim language or other language reciting "at least one of" a set and/or "one or more" of a set indicates that one member of the set or multiple members of the set (in any combination) satisfy the claim. For example, claim language reciting "at least one of A and B" or "at least one of A or B" means A, B, or A and B. In another example, claim language reciting "at least one of A, B, and C" or "at least one of A, B, or C" means A, B, C, or A and B, or A and C, or B and C, A and B and C, or any duplicate information or data (e.g., A and A, B and B, C and C, A and A and B, and so on), or any other ordering, duplication, or combination of A, B, and C. The language "at least one of" a set and/or "one or more" of a set does not limit the set to the items listed in the set. For example, claim language reciting "at least one of A and B" or "at least one of A or B" may mean A, B, or A and B, and may additionally include items not listed in the set of A and B.

Illustrative aspects of the disclosure include:

Aspect 1. A first device for wireless communication, comprising: a memory; and a processor coupled to the memory, the processor configured to: determine the first device is separated with respect to a second device associated with the first device; generate tag information associated with a public key; and based on the determination that the first device is separated, broadcast the tag information.

Aspect 2. The first device of Aspect 1, wherein the tag information comprises an encrypted permanent identifier of the first device.

Aspect 3. The first device of Aspect 2, wherein the processor is further configured to: obtain the public key, wherein the public key is a public key of a tracking service; and encrypt the permanent identifier based on the public key of the tracking service.

Aspect 4. The first device of Aspect 1, wherein, the processor is configured to obtain the public key, and wherein the tag information comprises a tag identifier.

Aspect 5. The first device of Aspect 4, wherein the tag identifier includes a hash of the public key.

Aspect 6. The first device of Aspect 4, wherein the tag identifier has a first length that is shorter than a second length of the public key.

Aspect 7. The first device of Aspect 1, wherein the tag information is based on the public key and a parameter.

Aspect 8. The first device of Aspect 7, wherein the processor is further configured to select the parameter based on a current time.

Aspect 9. The first device of Aspect 7, wherein the public key and the parameter are obtained from the second device.

Aspect 10. The first device of Aspect 1, wherein, to determine the first device is separated, the processor is configured to determine that a beacon of the second device has not been received within a threshold amount of time.

Aspect 11. The first device of Aspect 1, wherein the processor is further configured to: receive a signal from a wireless network; determine location information from the signal; encrypt the location information based on the public key; and broadcast the encrypted location information with the tag information.

Aspect 12. The first device of Aspect 1, wherein to broadcast the tag information the processor is configured to broadcast a routing identifier with the tag information.

Aspect 13. The first device of Aspect 12, wherein the routing identifier is encrypted based on a public key of a routing service.

Aspect 14. The first device of Aspect 1, wherein the tag information comprises coded tag information.

Aspect 15. A device for wireless communications, comprising: a memory; and a processor coupled to the memory, the processor configured to: receive a broadcast from a tag device, wherein the broadcast comprises a tag identifier; transmit the tag identifier to a first location tracking service; receive, from the first location tracking service, a public key associated with the tag device; obtain location information for the device; encrypt the location information based on the public key; and transmit the encrypted location information to the first location tracking service.

Aspect 16. The device of Aspect 15, wherein, to transmit the tag identifier to the first location tracking service, the processor is further configured to transmit the tag identifier to a routing service to forward the tag identifier to the first location tracking service.

Aspect 17. The device of Aspect 16, wherein, to receive the public key, the processor is configured to receive the public key from the routing service, wherein the public key was obtained by the routing service from the first location tracking service.

Aspect 18. The device of Aspect 15, wherein the broadcast further comprises a routing identifier.

Aspect 19. The device of Aspect 18, wherein the processor is further configured to transmit the routing identifier to a routing service.

Aspect 20. The device of Aspect 18, wherein the routing identifier identifies a second location tracking service, and wherein, to transmit the tag identifier to the first location tracking service, the tag identifier and routing identifier are transmitted to the first location tracking service to forward to the second location tracking service.

Aspect 21. The device of Aspect 18, wherein the routing identifier is encrypted.

Aspect 22. The device of Aspect 15, wherein the tag identifier has a first length that is shorter than a second length of the public key.

Aspect 23. A method for wireless communications, comprising: determining a first device is separated with respect to a second device associated with the first device; generating tag information associated with a public key; and based on the determination that the first device is separated, broadcasting the tag information.

Aspect 24. The method of Aspect 23, wherein the tag information comprises an encrypted permanent identifier of the first device.

Aspect 25. The method of Aspect 24, further comprising: obtaining the public key, wherein the public key is a public key of a tracking service; and encrypting the permanent identifier based on the public key of the tracking service.

Aspect 26. The method of Aspect 23, further comprising obtaining the public key and wherein the tag information comprises a tag identifier.

Aspect 27. The method of Aspect 26, wherein the tag identifier includes a hash of the public key.

Aspect 28. The method of Aspect 26, wherein the tag identifier has a first length that is shorter than a second length of the public key.

Aspect 29. The method of Aspect 23, wherein the tag information is based on the public key and a parameter.

Aspect 30. The method of Aspect 29, further comprising selecting the parameter based on a current time.

Aspect 31. The method of Aspect 29, wherein the public key and the parameter are obtained from the second device.

Aspect 32. The method of Aspect 23, wherein determining the first device is separated comprises determining that a beacon of the second device has not been received within a threshold amount of time.

Aspect 33. The method of Aspect 23, further comprising: receiving a signal from a wireless network; determining location information from the signal; encrypting the location information based on the public key; and broadcasting the encrypted location information with the tag information.

Aspect 34. The method of Aspect 1, wherein broadcasting the tag information comprises broadcasting a routing identifier with the tag information.

Aspect 35. The method of Aspect 34, wherein the routing identifier is encrypted based on a public key of a routing service.

Aspect 36. The method of Aspect 1, wherein the tag information comprises coded tag information.

Aspect 37. A method for wireless communications, comprising: receiving a broadcast from a tag device, wherein the broadcast comprises a tag identifier; transmitting the tag identifier to a first location tracking service; receiving, from the first location tracking service, a public key associated with the tag device; obtaining location information; encrypting the location information based on the public key; and transmitting the encrypted location information to the first location tracking service.

Aspect 38. The method of Aspect 37, wherein transmitting the tag identifier to the first location tracking service comprises transmitting tag identifier to a routing service to forward the tag identifier to the first location tracking service.

Aspect 39. The method of Aspect 38, wherein receiving the public key comprises receiving the public key from the routing service, wherein the public key was obtained by the routing service from the first location tracking service.

Aspect 40. The device of Aspect 37, wherein the broadcast further comprises a routing identifier.

Aspect 41. The method of Aspect 40, further comprising transmitting the routing identifier to a routing service.

Aspect 42. The method of Aspect 40, wherein the routing identifier identifies a second location tracking service, and wherein the tag identifier and routing identifier are transmitted to the first location tracking service to forward to the second location tracking service.

Aspect 43. The method of Aspect 40, wherein the routing identifier is encrypted.

Aspect 44. The method of Aspect 37, wherein the tag identifier has a first length that is shorter than a second length of the public key.

Aspect 45. A non-transitory computer-readable medium having stored thereon instructions that, when executed by one or more processors, cause the at one or more processors to perform an operation according to any of Aspects 23 to 44

Aspect 46. An apparatus for wireless communications, comprising one or more means for performing operations according to any of Aspects 23 to 44.

What is claimed is:

1. A first device for wireless communication, comprising:
a memory; and
a processor coupled to the memory, the processor configured to:
determine the first device is separated with respect to a second device associated with the first device;
generate tag information, wherein the tag information includes a tag identifier based on a public key and an encrypted routing identifier for a routing service to identify a location tracking service associated with the first device; and
based on the determination that the first device is separated, begin to broadcast the tag information.

2. The first device of claim 1, wherein the tag information comprises an encrypted permanent identifier of the first device.

3. The first device of claim 2, wherein the processor is further configured to:
obtain the public key, wherein the public key is a public key of a tracking service; and
encrypt the permanent identifier based on the public key of the tracking service.

4. The first device of claim 1, wherein, the processor is configured to obtain the public key, and wherein the tag information comprises a tag identifier.

5. The first device of claim 4, wherein the tag identifier includes a hash of the public key.

6. The first device of claim 4, wherein the tag identifier has a first length that is shorter than a second length of the public key.

7. The first device of claim 1, wherein the tag information is based on the public key and a parameter.

8. The first device of claim 7, wherein the processor is further configured to select the parameter based on a current time.

9. The first device of claim 7, wherein the public key and the parameter are obtained from the second device.

10. The first device of claim 1, wherein, to determine the first device is separated, the processor is configured to determine that a beacon of the second device has not been received within a threshold amount of time.

11. The first device of claim 1, wherein the processor is further configured to:
receive a signal from a wireless network;
determine location information from the signal;
encrypt the location information based on the public key; and
broadcast the encrypted location information with the tag information.

12. The first device of claim 1, wherein the encrypted routing identifier is encrypted based on a public key of the routing service.

13. The first device of claim 1, wherein the tag information comprises coded tag information.

14. A device for wireless communications, comprising:

a memory; and a processor coupled to the memory, the processor configured to:

receive a broadcast from a tag device, wherein the broadcast includes tag information, the tag information includes a tag identifier and a routing identifier for a routing service to identify a location tracking service associated with the device;

transmit the tag identifier to a first location tracking service based on the routing identifier;

receive, from the first location tracking service, a public key associated with the tag device;

obtain location information for the device;

encrypt the location information based on the public key; and transmit the encrypted location information to the first location tracking service.

15. The device of claim 14, wherein, to transmit the tag identifier to the first location tracking service, the processor is further configured to transmit the tag identifier to a routing service to forward the tag identifier to the first location tracking service.

16. The device of claim 15, wherein, to receive the public key, the processor is configured to receive the public key from the routing service, wherein the public key was obtained by the routing service from the first location tracking service.

17. The device of claim 14, wherein the processor is further configured to transmit the routing identifier to the routing service.

18. The device of claim 14, wherein the routing identifier identifies a second location tracking service, and wherein, to transmit the tag identifier to the first location tracking service, the tag identifier and routing identifier are transmitted to the first location tracking service to forward to the second location tracking service.

19. The device of claim 14, wherein the routing identifier is encrypted.

20. The device of claim 14, wherein the tag identifier has a first length that is shorter than a second length of the public key.

21. A method for wireless communications, comprising:

determining a first device is separated with respect to a second device associated with the first device;

generating tag information, wherein the tag information includes a tag identifier based on a public key and a routing identifier for a routing service to identify a location tracking service associated with the first device; and based on the determination that the first device is separated, begin broadcasting the tag information.

22. The method of claim 21, wherein the tag information comprises an encrypted permanent identifier of the first device.

23. The method of claim 22, further comprising:

obtaining the public key, wherein the public key is a public key of a tracking service; and encrypting the permanent identifier based on the public key of the tracking service.

24. The method of claim 21, further comprising obtaining the public key.

25. The method of claim 24, wherein the tag identifier includes a hash of the public key.

26. The method of claim 21, wherein the tag information is based on the public key and a parameter.

27. A method for wireless communications, comprising:

receiving a broadcast from a tag device, wherein the broadcast includes tag information, the tag information includes a tag identifier and a routing identifier for a routing service to identify a location tracking service associated with the tag device;

transmitting the tag identifier to a first location tracking service based on the routing identifier;

receiving, from the first location tracking service, a public key associated with the tag device;

obtaining location information;

encrypting the location information based on the public key; and transmitting the encrypted location information to the first location tracking service.

28. The method of claim 27, wherein transmitting the tag identifier to the first location tracking service comprises transmitting tag identifier to a routing service to forward the tag identifier to the first location tracking service.

* * * * *